United States Patent

Utsubo

(10) Patent No.: US 8,068,236 B2
(45) Date of Patent: Nov. 29, 2011

(54) IMAGE FORMING APPARATUS

(75) Inventor: Yoshiaki Utsubo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 940 days.

(21) Appl. No.: 10/927,813

(22) Filed: Aug. 27, 2004

(65) Prior Publication Data

US 2005/0058487 A1  Mar. 17, 2005

(30) Foreign Application Priority Data

Sep. 2, 2003  (JP) ................................. 2003-310178

(51) Int. Cl.
- G06F 3/12 (2006.01)
- G06F 11/00 (2006.01)
- G06K 15/00 (2006.01)
- G06Q 40/00 (2006.01)
- H04M 11/00 (2006.01)

(52) U.S. Cl. ........... 358/1.1; 358/1.14; 714/4.1; 705/40; 455/406

(58) Field of Classification Search .................... 400/76; 358/1.14

See application file for complete search history.

(56) References Cited

U.S. PATENT DOCUMENTS

| | | | |
|---|---|---|---|
| 6,313,921 B1* | 11/2001 | Kadowaki | 358/1.15 |
| 6,693,717 B1* | 2/2004 | Teradaira et al. | 358/1.14 |
| 7,158,946 B2* | 1/2007 | Sato et al. | 705/26 |
| 7,221,747 B2* | 5/2007 | Hlasny | 379/130 |
| 7,426,045 B2* | 9/2008 | Horiyama | 358/1.13 |
| 7,518,741 B2* | 4/2009 | Miyata | 358/1.1 |
| 2001/0054152 A1* | 12/2001 | Nakao et al. | 713/182 |
| 2002/0085847 A1* | 7/2002 | Yoshida et al. | 399/12 |
| 2002/0120565 A1* | 8/2002 | Yu et al. | 705/40 |
| 2003/0003983 A1* | 1/2003 | Walker et al. | 463/16 |
| 2004/0199634 A1* | 10/2004 | Jackowski et al. | 709/226 |
| 2005/0125305 A1* | 6/2005 | Benco et al. | 705/26 |

FOREIGN PATENT DOCUMENTS

| | | |
|---|---|---|
| JP | 2001-092620 A | 4/2001 |
| JP | 2001-337809 A | 12/2001 |
| JP | 2002-101086 A | 4/2002 |

OTHER PUBLICATIONS

Denise Pappalardo, "Wireless services tilt toward business; Wireless Business Packages: Providers get competitive with user-friendly features.(Sprint PCS)", Mar. 24, 2003, p. 2 of 4, line 35-38.*

* cited by examiner

*Primary Examiner* — Sudhanshu Pathak
*Assistant Examiner* — Mesfin Getaneh
(74) *Attorney, Agent, or Firm* — Panitch Schwarze Belisario & Nadel LLP

(57) ABSTRACT

It is an object of this invention to provide an image forming apparatus capable of coping suitably with the fluctuation in a used consumption amount at the predetermined period as well as grasping in advance feasibility of a use. To achieve the above, an image forming apparatus according this invention has an entry section for entering image forming data; a using amount storage means for storing a using amount of a consumption used at a predetermined period for purpose of image formation; a setting means for setting a usable consumption amount of the predetermined period; and a usable amount determining means for determining the usable consumption amount of each determined period, the usable amount determining means for determining after the predetermined period the usable amount of a subsequent period corresponding to the using amount.

9 Claims, 29 Drawing Sheets

IMAGE FORMING APPARATUS

BACKGROUND OF THE INVENTION

This invention relates to an image forming apparatus.

Conventionally, from a viewpoint to resource saving, some image forming apparatus such as a printer, e.g., such as described in Japanese Patent Application Publication No. JA-8-367470, has a function for limiting the usable sheet number of recording sheets. The image forming apparatus has a data memory means for memorizing a limited usable number of the recording sheets and a used recording sheet number already printed; a comparison means for making a summation of a printing request sheet number and the used sheet number to compare a summed result with the limited usable sheet number; and a controlling means for controlling to discontinue printing operation of printing data on the recording sheet in a case that as the compared result the limited usable sheet number becomes less than the summed result. The image forming apparatus is set as to return a using rejection message to a host apparatus as a requesting source in a case of receiving a printing request without use right in the printing request from the host apparatus.

The aforementioned conventional image forming apparatus, however, cannot suitably cope with fluctuation in the using sheet number at each predetermined period. The limited usable sheet number is set per the predetermined period, e.g., one month but the using recording sheet number changes at each period. Therefore, the recording sheets remain over or run short from month to month where the restricted using recording sheet number is monthly stabilized. In that case, an administrator monthly needs to adjust the restricted using sheet number. Furthermore, just before an end of the period, i.e., the end of the month, from thought that the prescribed number is to be fully used, unnecessary printing may be performed, so that an primary object to suppress printing performance cannot be achieved.

Until the summed result of the printing request sheet number plus the used sheet number reaches the limited usable sheet number, a host apparatus is informed nothing while informed an unprintable state when the summed result exceeds the printing request sheet number, so the host apparatus cannot grapes in advance when the printing operation becomes unprintable.

BRIEF SUMMARY OF THE INVENTION

It is an object of this invention to solve the aforementioned problems of the conventional printer apparatus and provide an image forming apparatus capable of coping suitably with the fluctuation in a used consumption amount during the predetermined period as well as grasping in advance feasibility of use.

To solve the aforementioned problems, an image forming apparatus according to this invention has an entry section for entering image forming data; a using amount storage means for storing a used amount of a consumption used during a predetermined period for image formation; a setting means for setting a usable consumption amount during the predetermined period; and a usable amount determining means for determining the usable consumption amount of each determined period, the usable amount determining means determining after the predetermined period the usable amount of a subsequent period according to the used amount.

According to this invention, the image forming apparatus according to this invention has an entry section for entering image forming data; a using amount storage means for storing a used amount of a consumption used during a predetermined period for image formation; a setting means for setting a usable consumption amount during the predetermined period; and a usable amount determining means for determining the usable consumption amount of each determined period, the usable amount determining means determining after the predetermined period the usable amount of a subsequent period according to the used amount.

With this invention, the image forming apparatus can correspond suitably even where the used amount of the consumption during each predetermined period changes.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
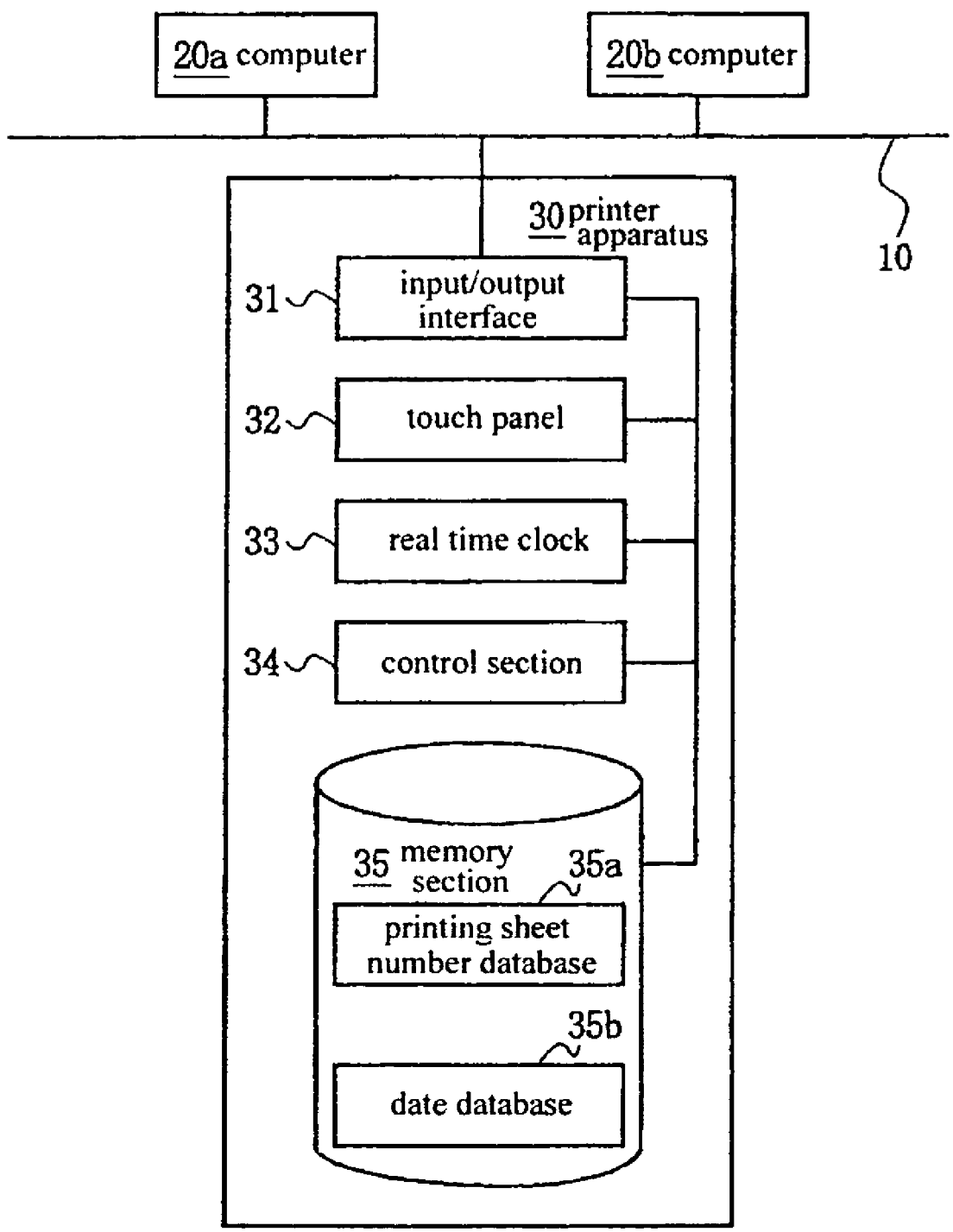
FIG. 1 is a block diagram showing a structure of an image forming system according to the first embodiment of this invention.

FIG. 1 is a block diagram showing a structure of an image forming system according to the first embodiment of this invention.

In figures, numeral 30 is a printer apparatus serving as an image forming apparatus being coupled as communicable though a network 10 to a computer 20a and a computer 20b as host apparatuses manipulated by a user or users.

Herein, each of the computer 20a and the computer 20b is, e.g., a personal computer, a server, or a workstation, i.e., such a computer having, e.g., an operation means made of, e.g., a CPU (Central Processing Unit) or a MPU (Micro Processing Unit), a memory means made of, e.g., a magnetic disk or a semiconductor memory, a display means made of, e.g., a CRT (Cathode Ray Tube) or a liquid crystal display; an entry means made of, e.g., a key board, and interfaces for communications, but can be any apparatus. The computer 20a and the computer 20b perform as the host apparatuses of the printer apparatus 30 to transmit the printer apparatus 30 a printing job. It is to be noted that the computer 20a and the computer 20b can be explained as a computer 20 when collectively explained. In figures, the shown example is the situation that the number of computers 20 coupled to the network 10 is two, the computer 20a and the computer 20b, but any number of computers 20, e.g., single or more than three, can be used.

The network 10 is defined as a wired or wireless communication network, e.g., a LAN (Local Area Network), a WAN (Wide Area Network), an intranet, the Internet, or the like but may be any kind of communication network, e.g., aggregation of plural communication networks.

The printer apparatus 30 can be any kind of printer apparatus, e.g., an inkjet printer, an electro-photographic printer, a thermal transfer printer, or the like. Herein, the printer apparatus 30 has an image forming apparatus for forming image to make printing operation on recording sheets as media, i.e., consumptions, and a controller for controlling the operation of the image forming apparatus. Where defined as, e.g., the electro-photographic printer, the image forming apparatus 30 has a photosensitive drum as an image carrier, a print head (LED (Light Emitting Diode) head) as an exposure means, a fixing device, a transfer device, and the like, not shown in figures, to make the printing operation on the medium by an electro-photographic process. The controller is a kind of computer having, e.g., the operation means such as the CPU (Central Processing Unit) or the MPU (Micro Processing Unit), the memory means such as the magnetic disk or the semiconductor memory, the display means such as the CRT (Cathode Ray Tube) or the liquid crystal display; the entry means such as a push-button or the key board, and the interfaces for communications, thereby interpreting the printing job and printing data and performing processings of, e.g., an image development process, thereby controlling the operation of the image forming apparatus to make the printing operation. It is preferable that the display means is a touch panel integrally having a function as the entry means.

From the viewpoint to functions, the printer apparatus 30 has an input/output interface 31, a touch panel 32, a real time clock 33, a control section 34, and a memory section 35. Herein, the input/output interface 31 serves as an entry section for entering image forming data and receives the printing job transmitted through the network 10 from the computer 20. The touch panel 32 serves as the display means and the entry means to operate a display on a setting screen and entry of setting items. The real time clock 33 counts time to reply a present date and time when receiving an inquiry. The real time clock 33 contains a battery so as to measure the time even where the power supply is turned off.

The memory section 35 has a printing sheet number database 35a and a date database 35b as using amount storage means, or using amount storage. The printing sheet number database 35a is an area for storing total printing sheet number, printable sheet number, standard printable sheet number, or the like. The standard printable sheet number is defined as the printable sheet number set with an after-described setting means, or setting unit, 34f in the control section 34. The date database 35b is defined as the area for storing an effective date as a predetermined period, and the effective date is defined as the date that the present printable sheet number is effective. Herein, according to this embodiment, the predetermined period, though can be set in any arbitrary way by the user, is set to one month. The effective date is therefore set on a monthly basis, e.g., "March 2003."

The setting screen displayed on the touch panel 32 will be next explained.

Figure 2:
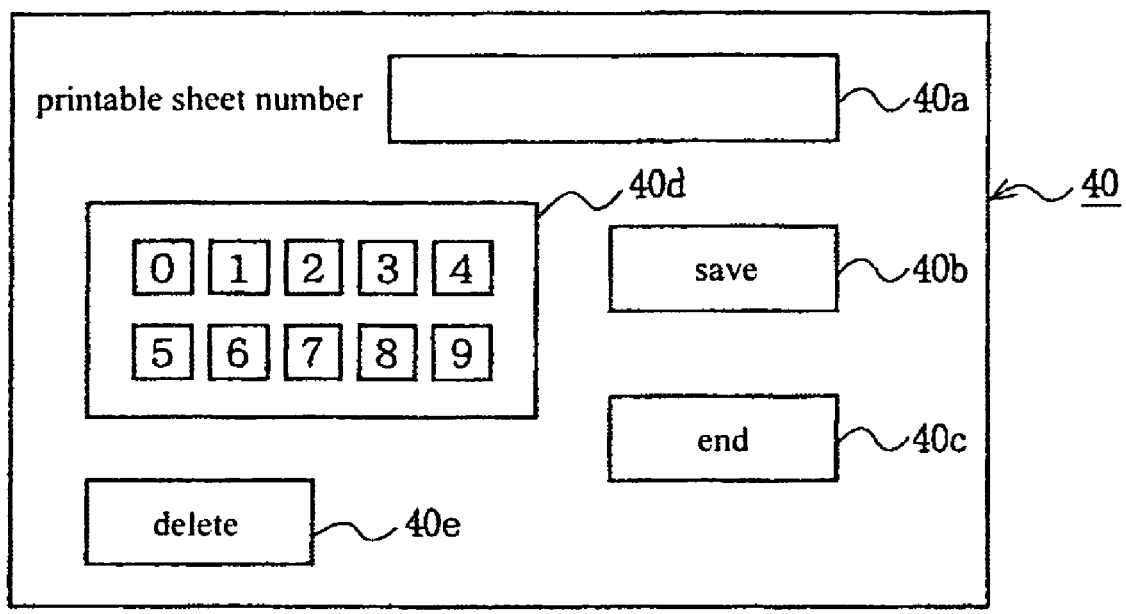
FIG. 2 is a view showing a setting screen according to the first embodiment of this invention.

FIG. 2 is a view showing the setting screen according to the first embodiment of this invention.

As showed in FIG. 2, the setting screen 40 displays a printable sheet number column 40a for entering the printable sheet number, a save button 40b for preserving a setting, an end button 40c for making the setting over, numeral buttons 40d for entering numerals from zero to nine, and a delete button 40e for deleting one letter.

A structure of the control section 34 for the printer apparatus 30 will be explained from the viewpoint to the function.

Figure 3:
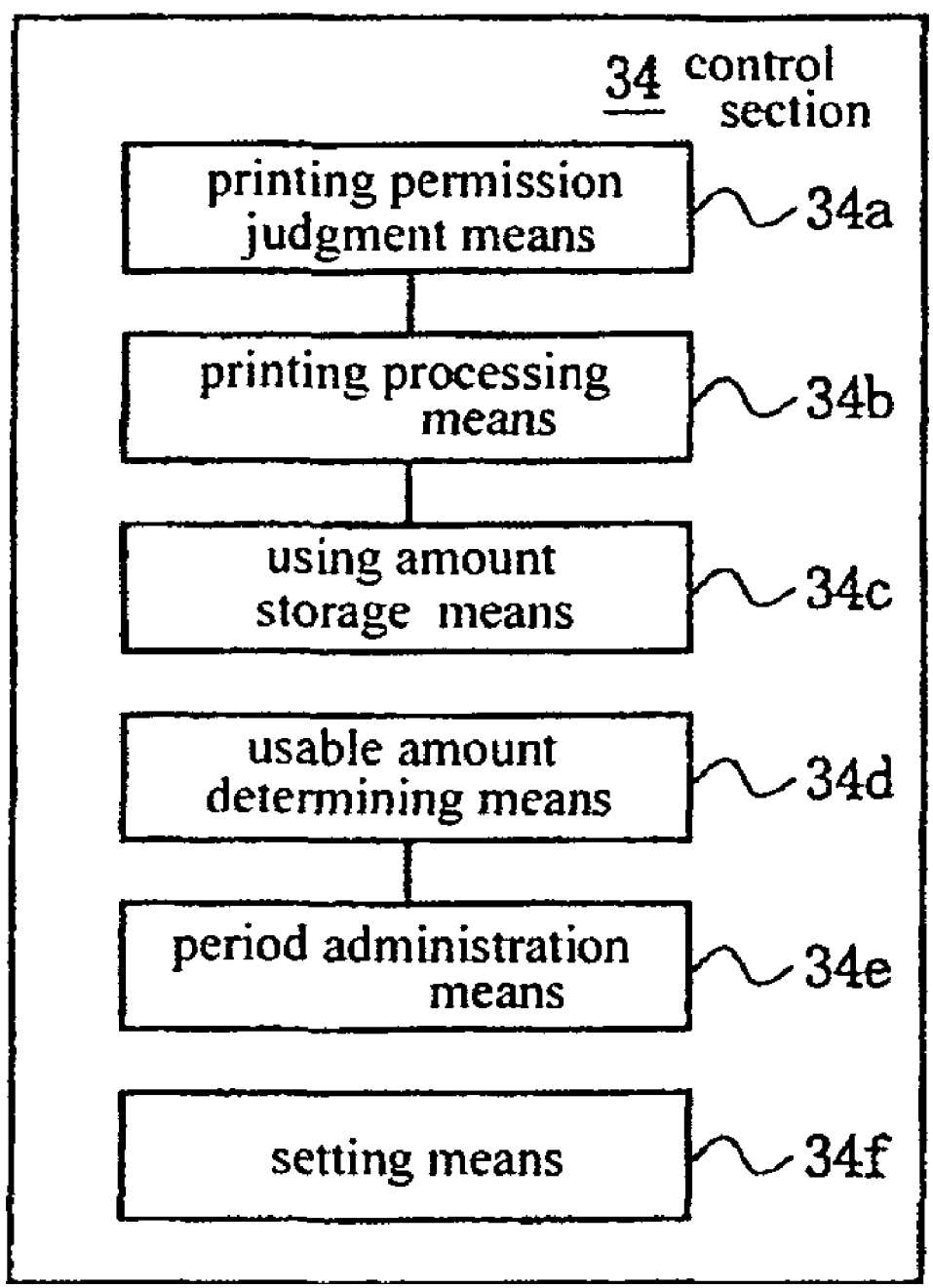
FIG. 3 is a block diagram showing a structure of a control section for the printer apparatus according to the first embodiment of this invention.

FIG. 3 is a block diagram showing the structure of the control section for the printer apparatus according to the first embodiment of this invention.

As showed in FIG. 3, from the viewpoint to the function, the control section 34 has a printing permission judgment means 34a, a printing processing means 34b for controlling the printing operation according to the printing job, the using amount storage means 34c for storing the total printing sheet number in the memory section 35, a usable amount determining means, or determiner, 34d for determining the printable sheet number, a period administration means 34e, and the setting means 34f, thereby controlling the printing operation on the recording sheets.

The printing permission judgment means 34e makes a judgment as to the permission or non-permission for the printing operation according to whether the total printing sheet number reaches the printable sheet number. The printing sheet number as the used amount, herein, is defined as the number of printed recording sheets, and the total printing sheet number, in this embodiment, is defined as a summation of the number of printed sheets for one month, and the printable sheet number as the usable amount is defined as the number of the recording sheets printable during one month.

The period administration means 34e detects and informs a state, where the next month begins, to the usable amount determining means 34b. The setting means 34f makes the touch panel 32 display the setting screen 40 for setting the printable sheet number as a standard, thereby storing in the printing sheet number database 35a of the memory section 35 the printable sheet number set on the setting screen 40.

Operation of the thus structured image forming apparatus will be next explained. Operation for setting the printable sheet number is explained first.

Figure 4:
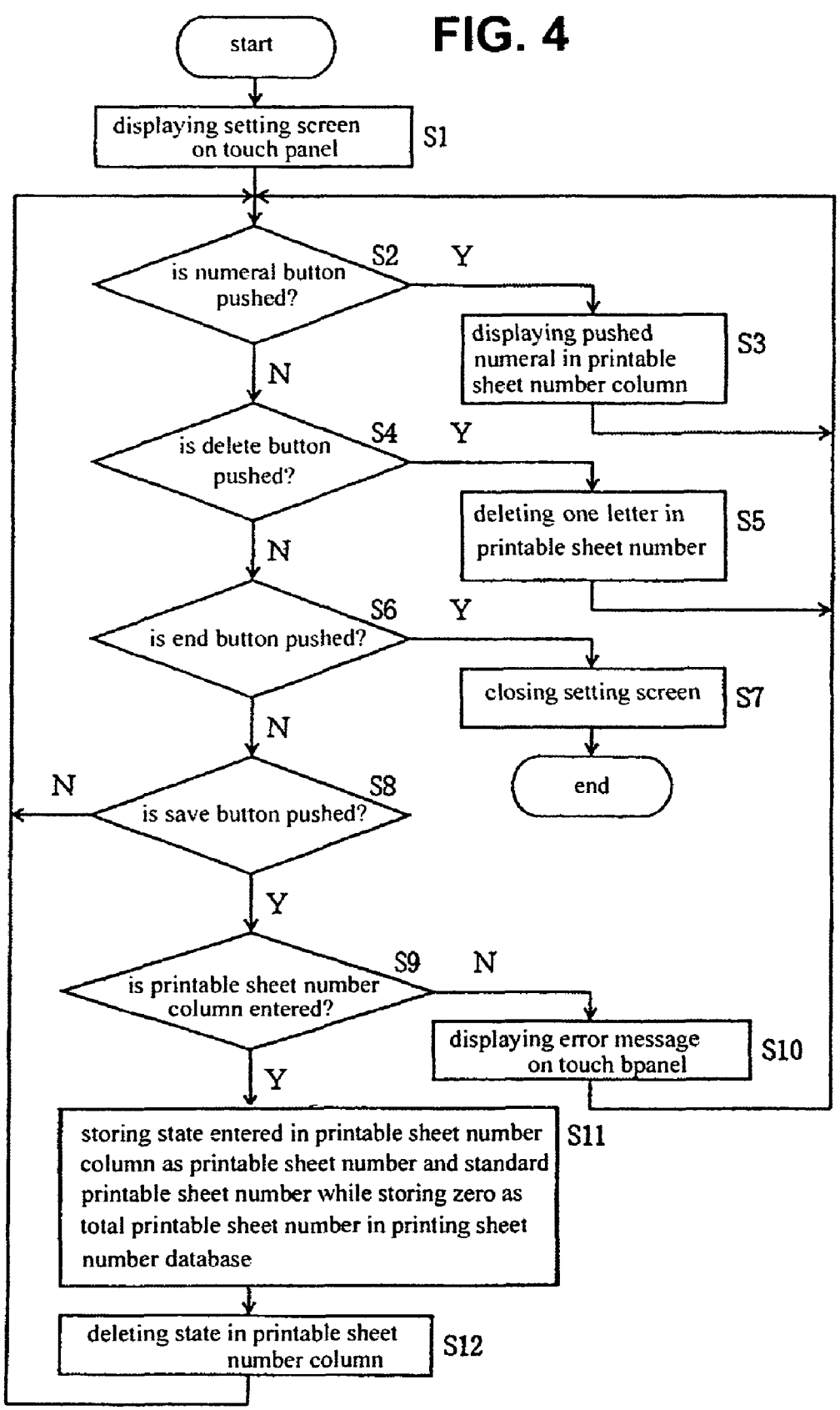
FIG. 4 is a flow chart showing operation of a setting process for a printable sheet number according to the first embodiment of this invention.

FIG. 4 is a flow chart showing the operation of a setting process for the printable sheet number according to the first embodiment of this invention.

Where the user, or the administrator, selects a function for setting the printable sheet number, the printer apparatus 30 displays the setting screen 40 on the touch panel 32. Where the administrator pushes the numeral button 40d, the printer apparatus 30 displays the pushed numeral in the printable sheet number column 40a; where the administrator pushes the delete button 40e, the printer apparatus 30 deletes one letter in the printable sheet number column 40a; and where the administrator pushes the end button 40c, the printer apparatus 30 closes the setting screen 40.

Where the administrator pushes the save button 40b, the printer apparatus 30 makes a judgment as to whether the printable sheet number column 40a is entered, and where the printable sheet number column 40a is not entered, the printer apparatus 30 displays an error message on the touch panel 32. On the other hand, where the printable sheet number column 40a is entered, the printer apparatus 30 stores in the printing sheet number database 35a the state in the printable sheet number column 40a as the printable sheet number and the standard printable sheet number as well as stores (resets) zero as the total printing sheet number while deleting the state in the printable sheet number column 40a.

A flow chart is hereinafter explained. The setting screen 40 is displayed on the touch panel 32 at the step S1. The judgment is made at the step S2 as to whether the numeral button 40d is pushed. Where the numeral button 40d is pushed, the operation goes to the step S3 while where the numeral button 40d is not pushed, the operation goes to the step S4. The pushed numeral is displayed in the printable sheet number column 40a at the step S3. The judgment is made at the step S4 as to whether the delete button 40e is pushed. Where the delete button 40e is pushed, the operation goes to the step S5 while where the delete button 40e is not pushed, the operation goes to S6. One letter in the printable sheet number column 40a is deleted at the step S5. The judgment is made at the step S6 as to whether the end button 40c is pushed. Where the end button 40c is pushed, the operation goes to the step S7 while where the end button 40c is not pushed, the operation goes to the step S8. The setting screen 40 is made closed, and this processing ends at the step S7. The judgment is made at the step S8 as to whether the save button 40b is pushed. Where the save button 40b is pushed, the operation goes to the step S9 while where the save button 40b is not pushed, the operation returns to the step S2. The judgment is made at the step S9 as to whether the printable sheet number column 40a is entered. Where the printable sheet number column 40a is entered, the operation goes to the step S11 while where the printable sheet number column 40a is not entered, the operation goes to the step S10. The error message is displayed on the touch panel 32 at the step S10. At the step S1, as the printable sheet number and the standard printable sheet number, the state in the printable sheet number column 40a is stored in the printing sheet number database 35a while zero is stored as the total printing sheet number. At the step S12, the state in the printable sheet number column 40a is deleted.

Operation in a case where the computer 20 transmits the printing job through the network 10 to the printer apparatus 30, will be next explained.

Figure 5:
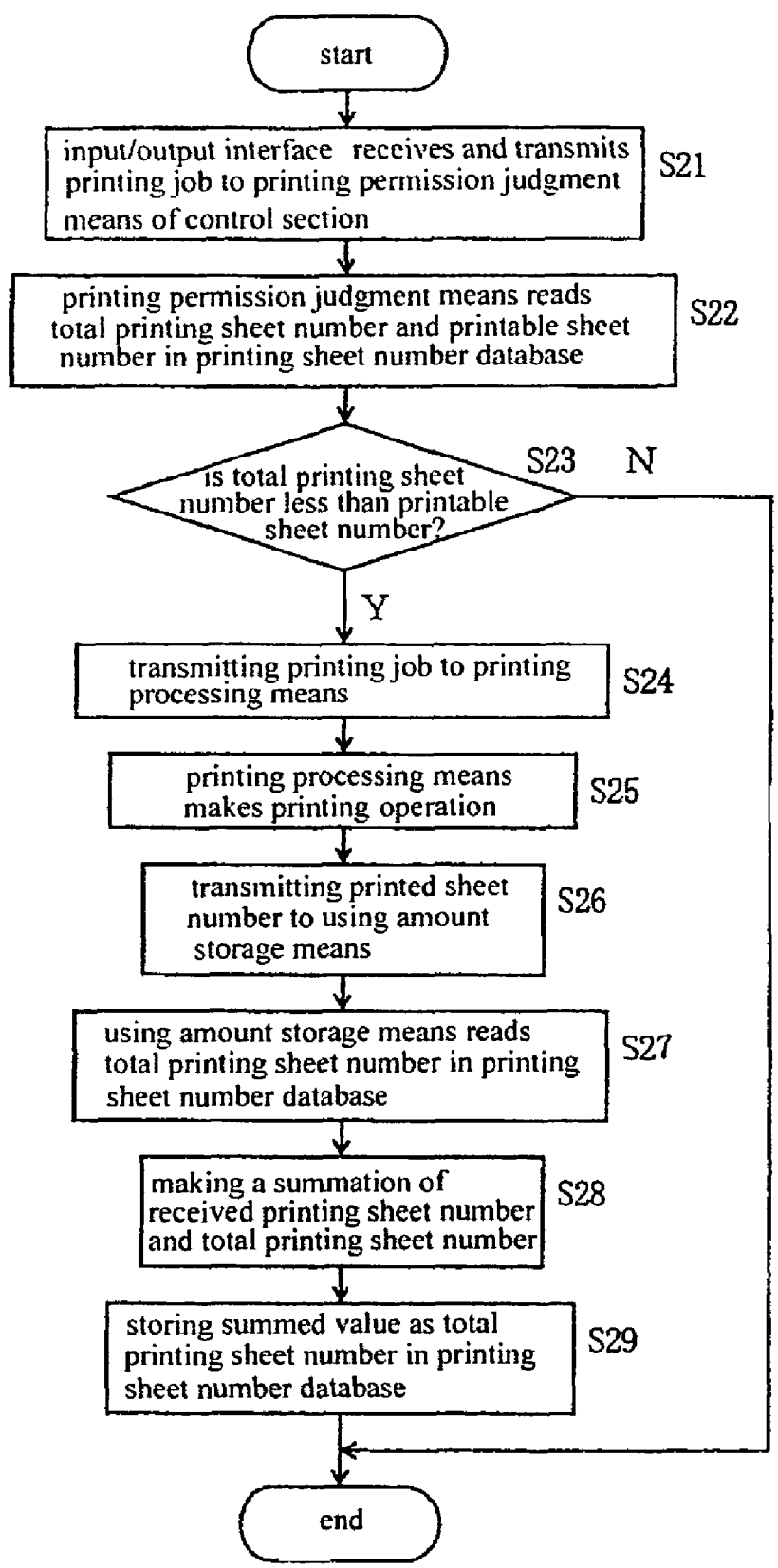
FIG. 5 is a flow chart showing operation in a case of receipt of a printing job according to the first embodiment of this invention.

FIG. 5 is a flow chart showing the operation in a case of receipt of the printing job according to the first embodiment of this invention.

The input/output interface 31 receives and transmits the printing job to the printing permission judgment means 34a. The printing permission judgment means 34a then retrieves in the printing sheet number database 35a the total printing sheet number and the printable sheet number, thereby comparing the total printing sheet number and the printable sheet number to make a judgment as to whether the total printing sheet number is less than the printable sheet number.

Where the total printing sheet number, subsequently, is less than the printable sheet number, the printing permission judgment means 34a transmits the printing job to the printing processing means 34b. The printing processing means 34b then makes the printing operation of the received printing job, thereby transmitting the printed sheet number to the using amount storage means 34c. It is to be noted that where the total printing sheet number is not less than the printable sheet number, this processing ends as it is made.

The using amount storage means 34c retrieves from the printing sheet number database 35a the total printing sheet number, thereby making a summation of the received printing sheet number and the total printing sheet number to store a summed value as the total printing sheet number in the printing sheet number database 35a.

A flow chart is hereinafter explained. The input/output interface 31 receives and transmits the printing job to the printing permission judgment means 34a of the control section 34 at the step S21. The printing permission judgment means 34a retrieves from the printing sheet number database 35a the total printing sheet number and the printable sheet number at the step S22. The judgment is made at the step S23 as to whether the total printing sheet number is less than the printable sheet number. Where the total printing sheet number is less than the printable sheet number, the operation goes to the step S24 while where the total printing sheet number is more than the printable sheet number, this processing ends. The printing permission judgment means 34a transmits the printing job to the printing processing means 34b at the step S24. The printing processing means 34b makes the printing operation at the step S25. The printing processing means 34b transmits the printed sheet number the using amount storage means 34c at the step S26. The using amount storage means 34c reads the total printing sheet number in the printing sheet number database 35a at the step S27. The using amount storage means 34c makes a summation of the received printing sheet number and the total printing sheet number at the step S28. The using amount storage means 34c stores the summed value as the total printing sheet number in the printing sheet number database 35a, and this processing ends at the step S29.

Operation in a case where the predetermined period (set to one month in this embodiment) past, will be next explained.

Figure 6:
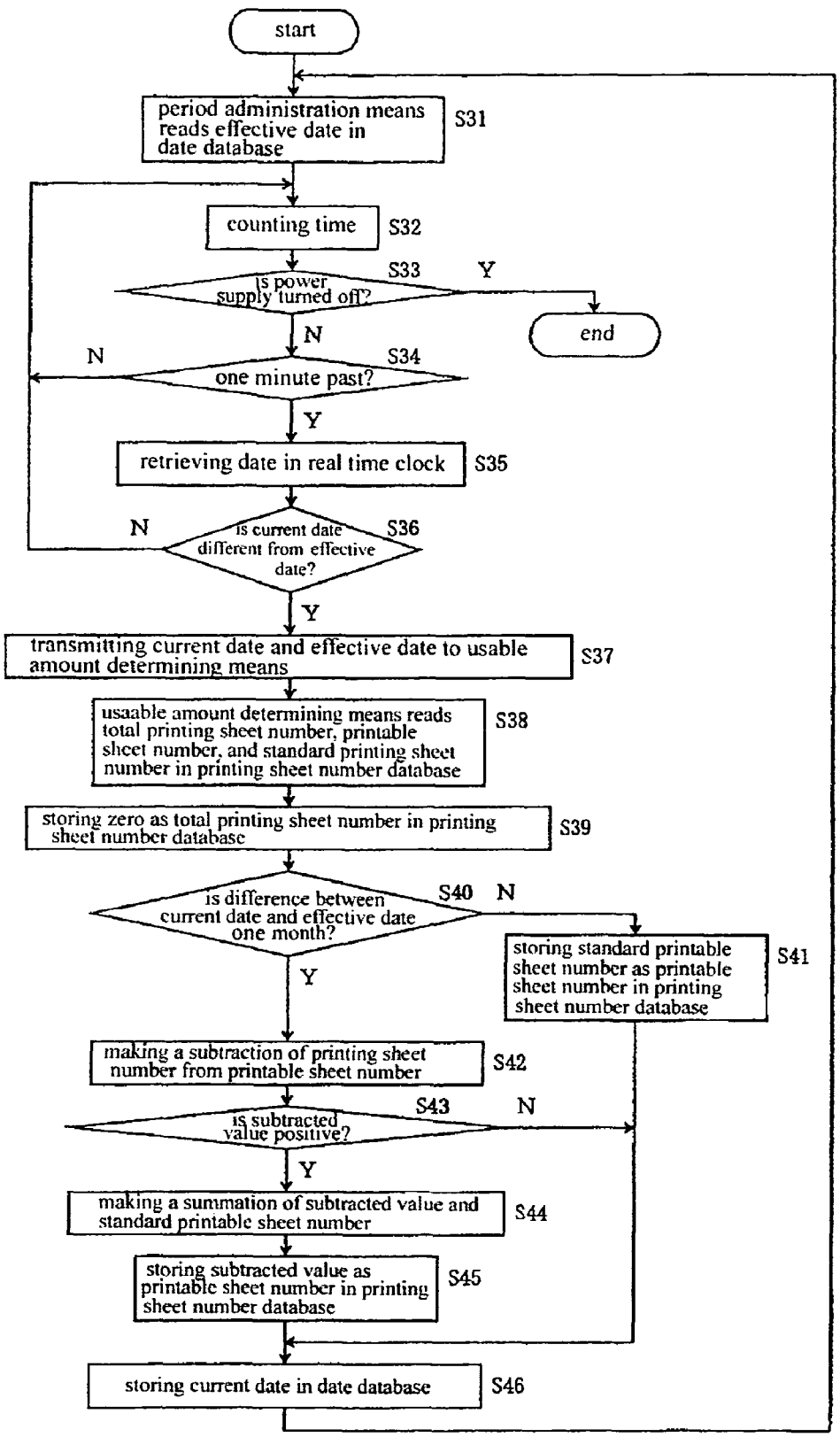
FIG. 6 is a flow chart showing operation in a case where a predetermined period past according to the first embodiment of this invention.

FIG. 6 is a flow chart showing the operation in a case where the predetermined period past according to the first embodiment of this invention.

When the power supply of the printer apparatus 30 is turned on, the period administration means 34e reads the effective date in the date database 35b, thereby counting time to confirm that the power supply is not turned off, and then gives an inquiry to the real time clock 33 for the date in a case where one minute past. Where the current date is different from the effective date, the period administration means 34e transmits the current date and the effective date to the usable amount determining means 34d.

The usable amount determining means 34d, subsequently, reads the total printing sheet number, the printable sheet number, and the standard printable sheet number, thereby storing zero as the total printing sheet number and comparing the current date with the effective date. Where a difference equal to or more than two months exists, the usable amount determining means 34d stores the standard printable sheet number as the printable sheet number in the printing sheet number database 35a. It is to be noted that where the power supply of the printer apparatus 30 remains turned off for more than one month, the printable sheet number is set to a default value (an initial value).

Where the difference between the current date and the effective date is one month (e.g., even where the effective date is "March 2003" while the current date is "April first, 2003", the difference between the month numbers is one, so this case corresponds to the term herein, "one month difference." More specifically, a carrying-over step is performed when the month changes), the usable amount determining means 34d makes a subtraction of the total printing sheet number from the printable sheet number. Where a subtracted value is positive, the usable amount determining means 34d makes a summation of the subtracted value and the standard printable sheet number, thereby storing the summed value as the printable sheet number in the printing sheet number database 35a as well as storing the current date ("March 2003" in the aforementioned example) in the date database 35b.

A flow chart is hereinafter explained. The period administration means 34e reads the effective date in the date database 35b at the step S31. The period administration means 34e counts time at the step S32. The judgment is made at the step S33 as to whether the power supply is turned off. Where the power supply is turned off, this processing ends whereas the operation goes to the step S34 where the power supply is not turned off. The judgment is made at the step S34 as to whether one minute past. Where one minute past, the operation goes to the step S35 while where one minute does not pass yet, the operation returns to the step S32. The period administration means retrieves the date from the real time clock 33 at the step S35. The judgment is made at the step S36 as to whether the current date is different from the effective date. Where the current date is different from the effective date, the operation goes to the step S37 while where the current date is not different from the effective date, the operation returns to the step S32. The period administration means 34e transmits the current date and the effective date to the usable amount determining means 34d at the step S37. At the step S38, the usable amount determining means 34d reads the total printing sheet number, the printable sheet number, and the standard printable sheet number in the printing sheet number database 35a. The usable amount determining means 34d stores zero as the total printing sheet number in the printing sheet number database 35a. The judgment is made at the step S40 as to whether the difference between the current date and the effective date is one month. Where the difference between the current date and the effective date is one month, the operation goes to the step S42 whereas the operation goes to the step S41 where the difference between the current date and the effective date is not one month. The usable amount determining means 34d stores the standard printable sheet number as the printable sheet number in the printing sheet number database 35a at the step S41. The usable amount determining means 34d makes a subtraction of the printing sheet number from the printable sheet number at the step S42. The judgment is made at the step S43 as to whether the subtracted value is positive. Where the subtracted value is positive, the operation goes to the step S44 while where the subtracted value is not positive, the operation goes to the step S46. The usable amount determining means 34d makes a summation of the subtracted value and the standard printable sheet number at the step S44. The usable amount determining means 34d stores the summed value as the printable sheet number in the printing sheet number database 35a at the step S45. The usable amount determining means 34d stores the current date in the date database 35b at the step S46.

According to this embodiment, like the above, the administrator simply sets the printable sheet number for one month at the start, so that the monthly surplus sheet number is automatically added to the printable sheet number for the next month. Therefore, it is possible to cope suitably with a case of the monthly fluctuation in the printing sheet number. Furthermore, it never happens that the user fully uses the surplus sheet number in vein.

The second embodiment according to this invention will be next explained. Structured same as the first embodiment is assigned same numeral to omit corresponding explanation. Explanation for the same operation and effect as the first embodiment is also omitted.

Figure 7:
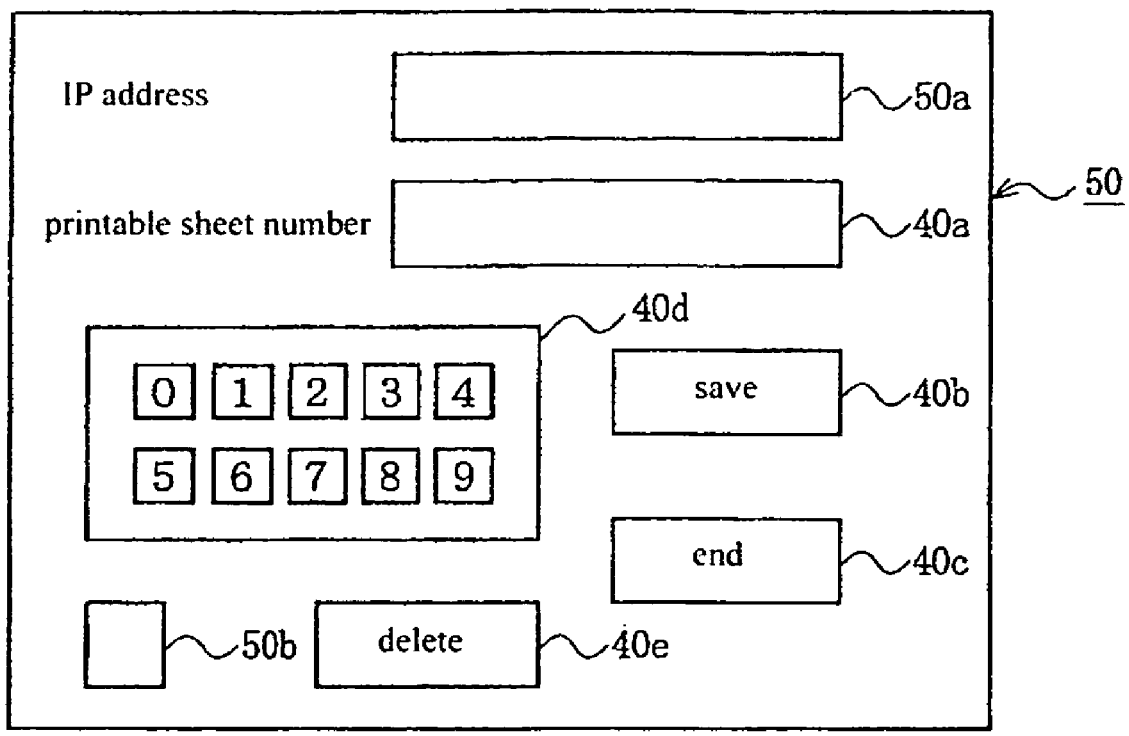
FIG. 7 is a view showing a setting screen according to the second embodiment of this invention.

FIG. 7 is a view showing the setting screen according to the second embodiment of this invention.

In this embodiment, the computer 20a and the computer 20b are set to transmit IP (Internet Protocol) addresses assigned respectively as user identification information as well as the printing job as image forming data to the printer apparatus 30. The input/output interface 31 receives the IP addresses and the printing jobs through the network 10. Therefore, the printer apparatus 30 according to this embodiment can administrate the printable sheet number as the using amount for each IP address.

The setting means 34f displays on the touch panel 32 the setting screen 50 for setting the printable sheet number, thereby storing the IP address and the printable sheet number set on the setting screen 50 in the memory section 35. Furthermore, the memory section 35 has the printing sheet number database 35a and the date database 35b, and the printing sheet number database 35a stores the IP address, the total printing sheet number, the printable sheet number, and a quasi-printable sheet number for each computer 20 identified with the IP address.

In this embodiment, as shown in FIG. 7, the setting screen 50 has the IP address column 50a for entering the IP address performing the setting and a dot button for entering a dot in the IP address are set on the setting screen 50. The IP address column 50a and the printable sheet number column 40a becomes enterable by being touched. The IP address column 50a initially becomes enterable when the screen is displayed.

Operation of the printer apparatus 30 according to this embodiment will be next described. The operation for setting the printable sheet number for each IP addresses is first explained.

Figure 8:
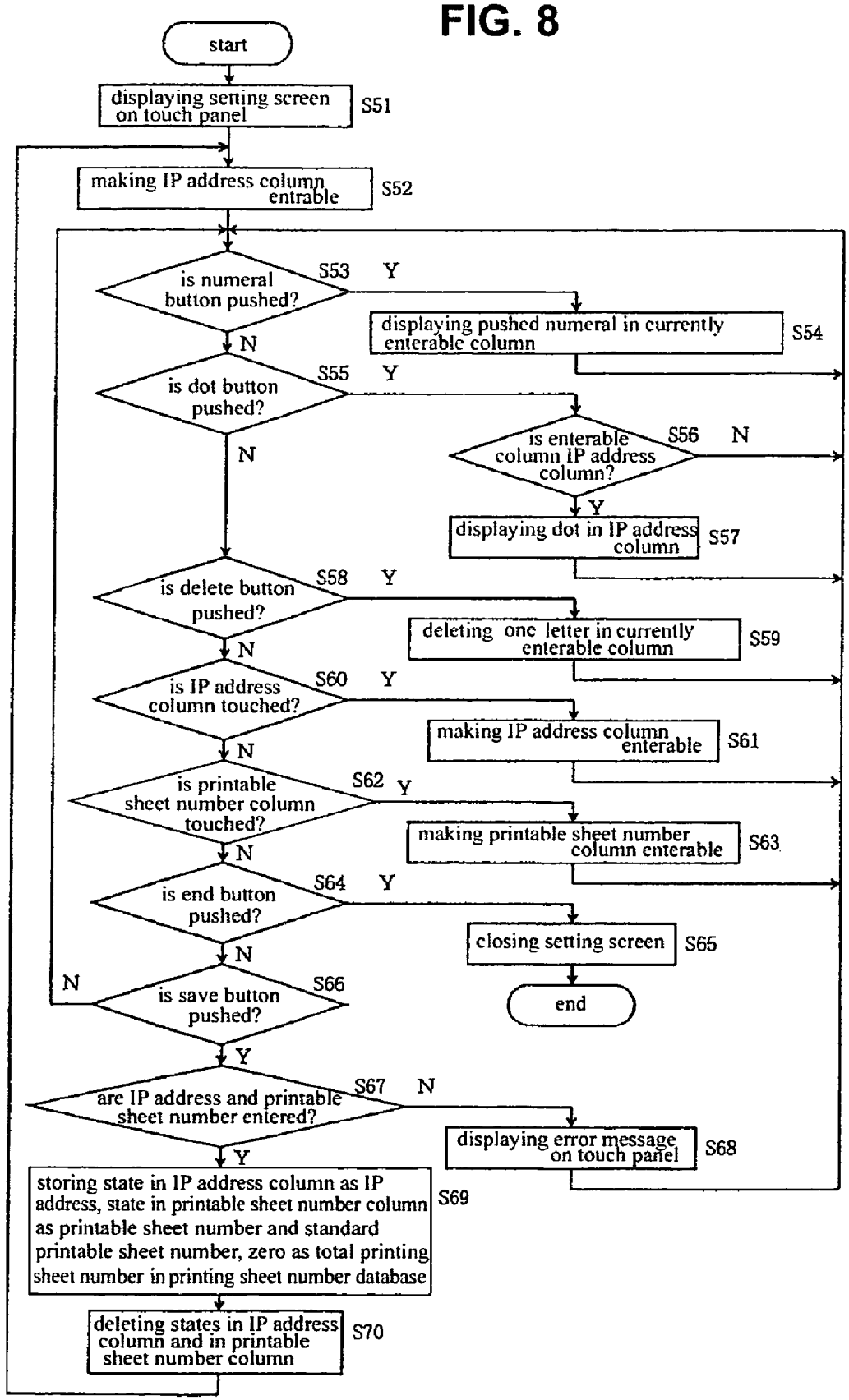
FIG. 8 is a flow chart showing operation of a setting process for a printable sheet number according to the second embodiment of this invention.

FIG. 8 is a flow chart showing the operation of a setting process for the printable sheet number according to the second embodiment of this invention.

Where the administrator selects a function for setting the printable sheet number, the printer apparatus 30 displays the setting screen 50 on the touch panel 32 to make the IP address column 50 enterable. Where the numeral button 40d is pushed, the printer apparatus 30 displays the pushed numeral in the currently enterable column. Where the dot button 50b is pushed, the judgment is made as to whether the currently enterable column is the IP address column 50a. Where the currently enterable column is the IP address column 50a, the dot is displayed. Furthermore, where the delete button 40e is pushed, one letter in the currently enterable column is deleted. The IP address column 50a is made enterable by being touched. The printable sheet number column 40a is made enterable by being touched. Where the end button 40c is pushed, the setting screen 50 is made closed.

When the save button 40b is pushed, the judgment is made as to whether the IP address column 50a and the printable sheet number column 40a are entered. Where the IP address column 50a and the printable sheet number column 40a are not entered, the printer apparatus 30 displays the error message on the touch panel 32. Where the IP address column 50a and the printable sheet number column 40a are already entered, the printer apparatus 30 stores the state in the IP address column 50a as IP address, the state in the printable sheet number column 40a as the printable sheet number and the standard printable sheet number, and zero as the total printing sheet number in the printing sheet number database 35a while the states in the IP address column 50a and the printable sheet number column 40a are deleted.

A flow chart is hereinafter explained. The printer apparatus 30 displays setting screen 50 on the touch panel 32 at the step S51. The printer apparatus makes IP address column 50a enterable at the step S52. The judgment is made at the step S53 as to whether the numeral button 40d is pushed. Where the numeral button 40d is pushed, the operation goes to the step S54 while where the numeral button 40d is not pushed, the operation goes to the step S55. The printer apparatus 30 displays the pushed numeral in the currently enterable column at the step S54. The judgment is made at the step S55 as to whether the dot button 50b is pushed. Where the dot button 50b is pushed, the operation goes to the step S56 while where the dot button 50b is not pushed, the operation goes to the step S58. The judgment is made at the step S56 as to whether the enterable column is the IP address column 50a. Where the enterable column is the IP address column 50a, the operation goes to the step S57 while where the enterable column is not the IP address column 50a, the operation returns to the step S53. The printer apparatus 30 displays the dot in the IP address column at 50a the step S57. The judgment is made at the step S58 as to whether the delete button 40e is pushed. Where the delete button 40e is pushed, the operation goes to the step S59 while where the delete button 40e is not pushed, the operation goes to the step S60. One letter in the currently enterable column is deleted at the step S59. The judgment is made at the step S60 as to whether the IP address column 50a is touched. Where the IP address column 50a is touched, the operation goes to the step S61 while where the IP address column 50a is not touched, the operation goes to the step S62. The printer apparatus 30 makes the IP address column 50a enterable at the step S61. The judgment is made at the step S62 as to whether the printable sheet number column 40a is touched. Where the printable sheet number column 40a is touched, the operation goes to the step S63 while where the printable sheet number column 40a is not touched, the operation goes to the step S64. The printer apparatus 30 makes the printable sheet number column 40a enterable at the step S63. The judgment is made at the step S64 as to whether the end button 40c is pushed. Where the end button 40c is pushed, the operation goes to the step S65 while where the end button 40c is not pushed, the operation goes to the step S66. The setting screen 50 is made closed, and this processing ends at the step 65. The judgment is made at the step S66 as to whether the save button 40b is pushed. Where the save button 40b is pushed, the operation goes to the step S67 while where the save button 40b is not pushed, the operation returns to the step S53. The judgment is made at the step S67 as to whether both the IP address and the printable sheet number are entered. Where both the IP address and the printable sheet number are entered, the operation goes to the step S69 while where neither the IP address nor the printable sheet number is entered, the operation goes to the step S68. The printer apparatus 30 displays the error message on the touch panel 32 at the step S68. At the step S68, the printer apparatus 30 stores the state in the IP address column 50a as IP address, the state in the printable sheet number column 40a as the printable sheet number and the standard printable sheet number, and zero as the total printing sheet number in the printing sheet number database 35a. The states in the IP address column 50a and the printable sheet number column 40a are deleted at the step S70.

Operation in a case where the computer 20 transmits the IP address and the printing job though the network 10 to the printer apparatus 30 will be next explained.

Figure 9:
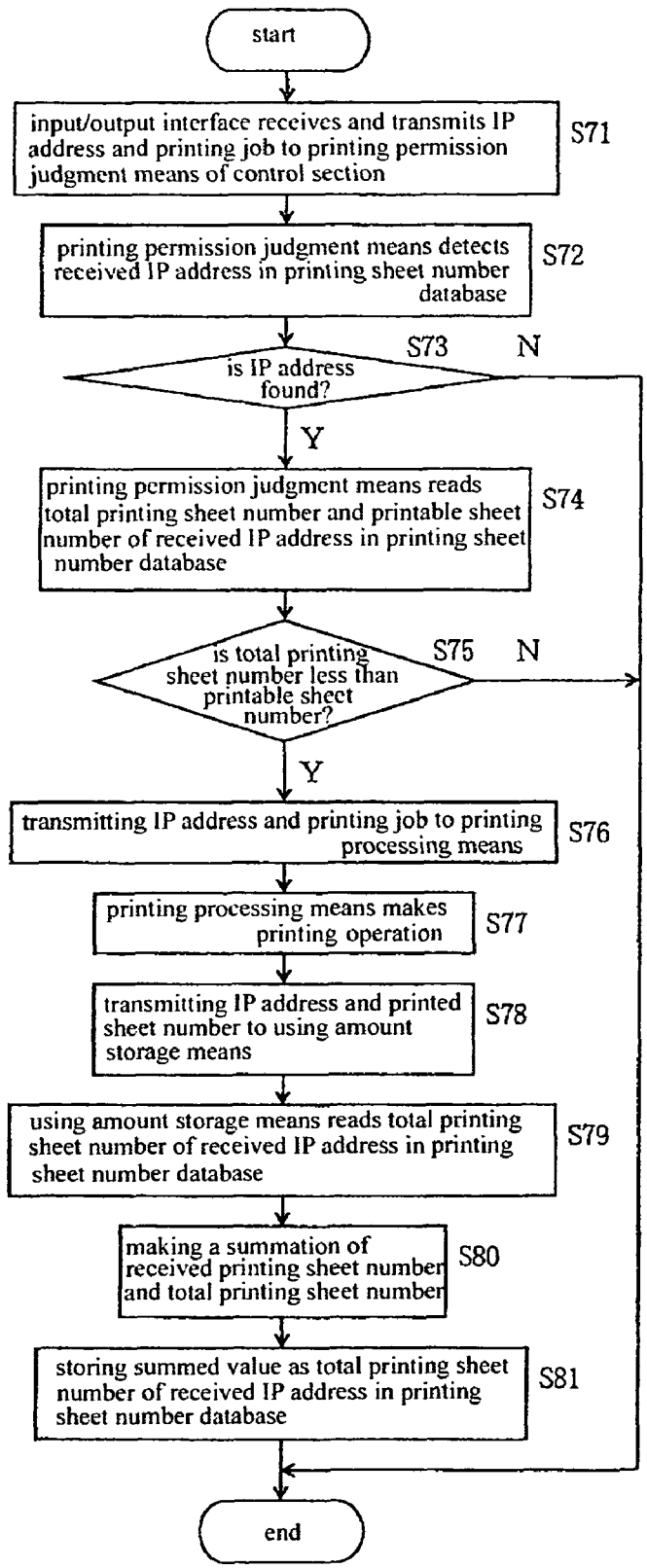
FIG. 9 is a flow chart showing operation in a case of receipt of an IP address and a printing job according to the second embodiment of this invention.

FIG. 9 is a flow chart showing the operation in a case of receipt of the IP address and the printing job according to the second embodiment of this invention.

The input/output interface 31 first receives and transmits the IP address and the printing job to the printing permission judgment means 34a of the control section 34. The printing permission judgment means 34a detects the received IP address in the printing sheet number database 35a to make a judgment as to whether the IP address is found. Where the IP address is found, the printing permission judgment means 34a reads the total printing sheet number and the printable sheet number of the received IP address in the printing sheet number database 35a to make a comparison between the total printing sheet number and the printable sheet number of the IP address, thereby making a judgment as to whether the total printing sheet number is less than the printable sheet number.

The total printing sheet number, subsequently, is less than the printable sheet number, the printing permission judgment means 34a transmits the received IP address and the printing job to the printing processing means 34b. The printing processing means 34b then makes the printing operation of the received printing job, thereby transmitting the printed sheet number and the received IP address to the using amount storage means 34c.

The using amount storage means 34c reads in the printing sheet number database 35a the total printing sheet number of the received IP address to make a summation of the received printing sheet number and the total printing sheet number, thereby storing the summed value as the total printing sheet number of the received IP address in the printing sheet number database 35a.

A flow chart is hereinafter explained. The input/output interface 31 receives and transmits the IP address and the printing job to the printing permission judgment means 34a of the control section 34 at the step S71. The printing permission judgment means 34a detects the received IP address in the printing sheet number database 35a at the step S72. The judgment is made at the step S73 as to whether the IP address is found. Where the IP address is found, the operation goes to the step S74 while where the IP address is not found, this processing ends. The printing permission judgment means 34a reads the total printing sheet number and the printable sheet number of the received IP address in the printing sheet number database 35a at the step S74. The judgment is made at the step S75 as to whether the total printing sheet number is less than the printable sheet number. Where the total printing sheet number is less than the printable sheet number, the operation goes to the step S76 while where the total printing sheet number is more than the printable sheet number, this processing ends. The IP address and the printing job are transmitted to the printing processing means 34b at the step S76. The printing processing means 34b makes the printing operation at the step S77. The IP address and the printed sheet number are transmitted to the using amount storage means 34c at the step S78. The using amount storage means 34c reads in the printing sheet number database 35a the total printing sheet number of the received IP address at the step S79. The using amount storage means 34c makes a summation of the received printing sheet number and the total printing sheet number at the step S80. The using amount storage means stores the summed result as the total printing sheet number of the received IP address in the printing sheet number database 35a, and this processing ends at the step S81.

Operation in a case where the predetermined period (set to one month in this embodiment) past, will be next explained.

Figure 10:
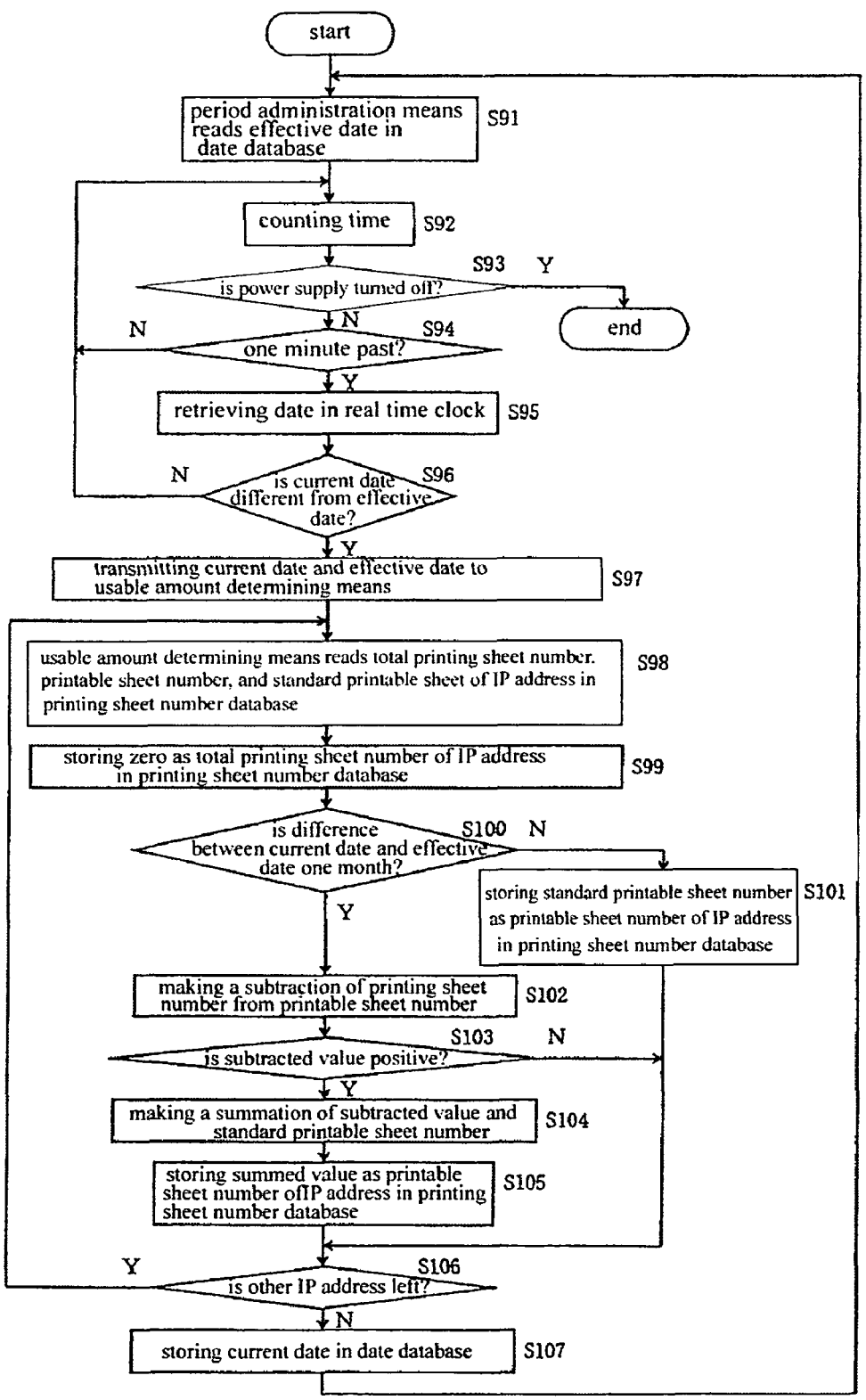
FIG. 10 is a flow chart showing operation in a case where a predetermined period past according to the second embodiment of this invention.

FIG. 10 is a flow chart showing the operation in a case where the predetermined period past according to the second embodiment of this invention.

When the power supply of the printer apparatus 30 is turned on, the period administration means 34e reads the effective date in the date database 35b, thereby counting time, thereby confirming that the power supply is not turned off, and then inquires the real time clock 33 for the date in a case where one minute past. Where the current date is different from the effective date, the period administration means 34e transmits the current date and the effective date to the usable amount determining means 34d.

The usable amount determining means 34d, subsequently, reads the total printing sheet number, the printable sheet number, and the standard printable sheet number of the IP address in the printing sheet database 35a, thereby storing zero as the total printing sheet number, thereby comparing the current date with the effective date. Where the difference of more than two months exists, the usable amount determining means 34d stores the standard printable sheet number as the printable sheet number of the IP address in the printing sheet number database 35a.

Where the difference between the current date and the effective date is one month, the usable amount determining means 34d makes a subtraction of the total printing sheet number from the printable sheet number. Where a subtracted value is positive, the usable amount determining means 34d makes a summation of the subtracted value to the standard printable sheet number, thereby storing the summed value as the printable sheet number of the IP address in the printing sheet number database, thereby making a judgment as to whether other IP address exists. Where no more IP address exists, the usable amount determining means 34d stores the current date in the date database 35b.

A flow chart is hereinafter explained. The period administration means 34e reads the effective date in the date database at the step S91. The period administration means counts the time at the step S92. The judgment is made at the step S93 as to whether the power supply is turned off. Where the power supply is turned off, this processing ends while where the power supply is not turned off, the operation goes to the step S94. The judgment is made at the step S94 as to whether one minute past. Where one minute past, the operation goes to the step S95 while where one minute does not pass yet, the operation returns to the step S92. The period administration retrieves the date in the real time clock 33 at the step S95. The judgment is made at the step S96 as to whether the current date is different from the effective date. Where the current date is different from the effective date, the operation goes to the step S97 while where the current date is not different from the effective date, the operation returns to the step S92. The current date and the effective date are transmitted to the usable amount determining means 34d at the step S97. At the step S98, the usable amount determining means 34d reads in the printing sheet number database 35a the total printing sheet number, the printable sheet number, and the standard printable sheet number of the IP address. The usable amount determining means 34d stores zero as the total printing sheet number of the IP address in the printing sheet number database 35a at the step S99. The judgment is made at the step S100 as to whether the difference between the current date and the effective date is one month. Where the difference between the current date and the effective date is one month, the operation goes to the step S102 while where the difference between the current date and the effective date is not one month, the operation goes to the step S101. The usable amount determining means 34d stores standard printable sheet number as the total printing sheet number of the IP address in the printing sheet number database 35a at the step S101. The usable amount determining means 34d makes a subtraction of the printing sheet number from the printable sheet number at the step S102. The judgment is made at the step S103 as to whether the subtracted value is positive. Where the subtracted value is positive, the operation goes to the step S104 while where the subtracted value is not positive, the operation goes to the step S106. The usable amount determining means 34d makes a summation of the subtracted value and the standard printable sheet number at the step S104. The usable amount determining means 34d sores the summed value as the total printing sheet number of the IP address in the printing sheet number database 35a at the step S105. The judgment is made at the step S106 as to whether any more IP address is left. Where more IP address is left, the operation returns to the step S98 while where no more IP address is left, the operation goes to the step S107. The current date is stored in the date database 35b at the step S107.

According to this embodiment, like the above, the printable sheet number can be set for each computer 20, and the monthly surplus sheet number can be automatically added to the printable sheet number of the next month for each computer 20. Therefore, each computer 20 can obtain the effect of the first embodiment, and furthermore, it is possible to cope suitably with a case where the particular computer dominates the printing operation.

The third embodiment according to this invention will be next explained. Structured same as the first and the second embodiments is assigned same numeral to omit corresponding explanation. Explanation for same operation and effect as the first and the second embodiments is also omitted.

Figure 11:
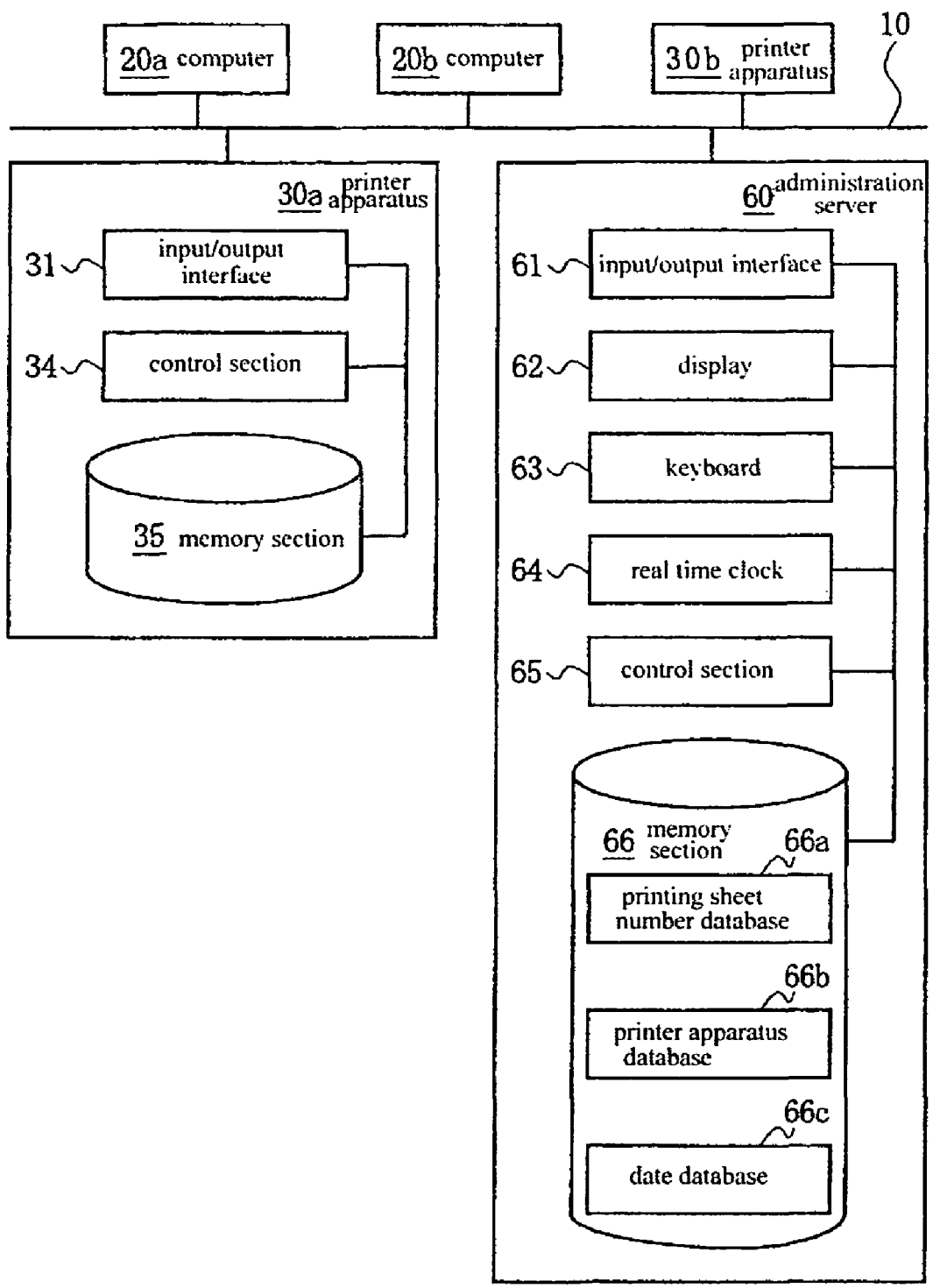
FIG. 11 is a block diagram showing a structure of an image forming system according to the third embodiment of this invention.

FIG. 11 is a block diagram showing a structure of the image forming system according to the third embodiment of this invention.

As shown in FIG. 11, the network 10 interfaces as communicable one another the computers 20a, computer 20b, the administration server 60, as well as a printer apparatus 30a, a printer apparatus 30b as the image forming apparatuses. The computer 20a and the computer 20b transmit the IP addresses as the user identification information and the printing jobs as image forming data respectively to the printer apparatus 30a and the printer apparatus 30b. It is to be noted that the printer apparatus 30a and the printer apparatus 30b are explained as the printer apparatus 30 when synthetically explained. FIG. 11 shows an example where the number of printer apparatuses 30 interfaced to the network 10 is two, the printer apparatus 30a and the printer apparatus 30b, but any number of computers 20, e.g., the one or more than three, may be acceptable.

From the viewpoint to the function, the printer apparatus 30 has the input/output interface 31 as the entry section, the control section 34 and the memory section 34 to make the printing operation according to the printing job enter with the input/output interface 31. The input/output interface 31 receives the IP address and the printing job of the computer 20 through the network 10. The memory section 35 stores the IP address, the total printing sheet number, the printing permission judgment means for each IP address for computer 20.

The administration server 60 is the computer having, e.g., the operation means, e.g., the CPU (Central Processing Unit) or the MPU (Micro Processing Unit); the memory means, e.g., the magnetic disk or the semiconductor memory; the display means, e.g., the CRT (Cathode Ray Tube) or the liquid crystal display; the entry means, e.g., the key board; and the interface communication. From the viewpoint to the function, the administration server 60 has an input/output interface 61, a display 62, a keyboard 63, a real time clock 64, a control section 65, and a memory section 66, thereby retrieving the total printing sheet number in the printer apparatus 30, thereby controlling the permission for the printing.

The input/output interface 61 transmits an order and receives the data through the network 10 to/from the printer apparatus 30. The display 62 displays a printable sheet number setting screen 70 and a printer apparatus setting screen 80 to be hereinafter described. The keyboard 63 has the numeral key for entering numeral, the dot key for entering dot, the delete key for deleting one letter, and a tab key for shifting the enterable column, thereby performing the entry on the printable sheet number setting screen 70 and the printer apparatus setting screen 80. The real time clock 64 counts time, and replies the current date and time when receives the inquiry. The real time clock 64 contains a battery so as to count time even where a power supply of the administration server 60 is turned off.

The memory section 66 has a printing sheet number database 66a, a printer apparatus database 66b, and a date database 66c. Herein, the printing sheet number database 66a functions as the using amount storage means, thereby being an area for storing the IP address, the total printing sheet number, the printable sheet number, the standard printable sheet number, the printing permission information, or the like for each IP address. The standard printable sheet number is the printable sheet number set with an after-mentioned setting means 65d of the control section 65. The printer apparatus database 66b is an area for storing the printer apparatus retrieving the total printing sheet number. The date database 66c functions as the using amount storage means, thereby being an area for storing the effective date. It is to be noted that the effective date is defined as the period when the current printable sheet number is effective.

The control section 34 of the printer apparatus 30 will be next explained from the viewpoint to the function.

Figure 12:
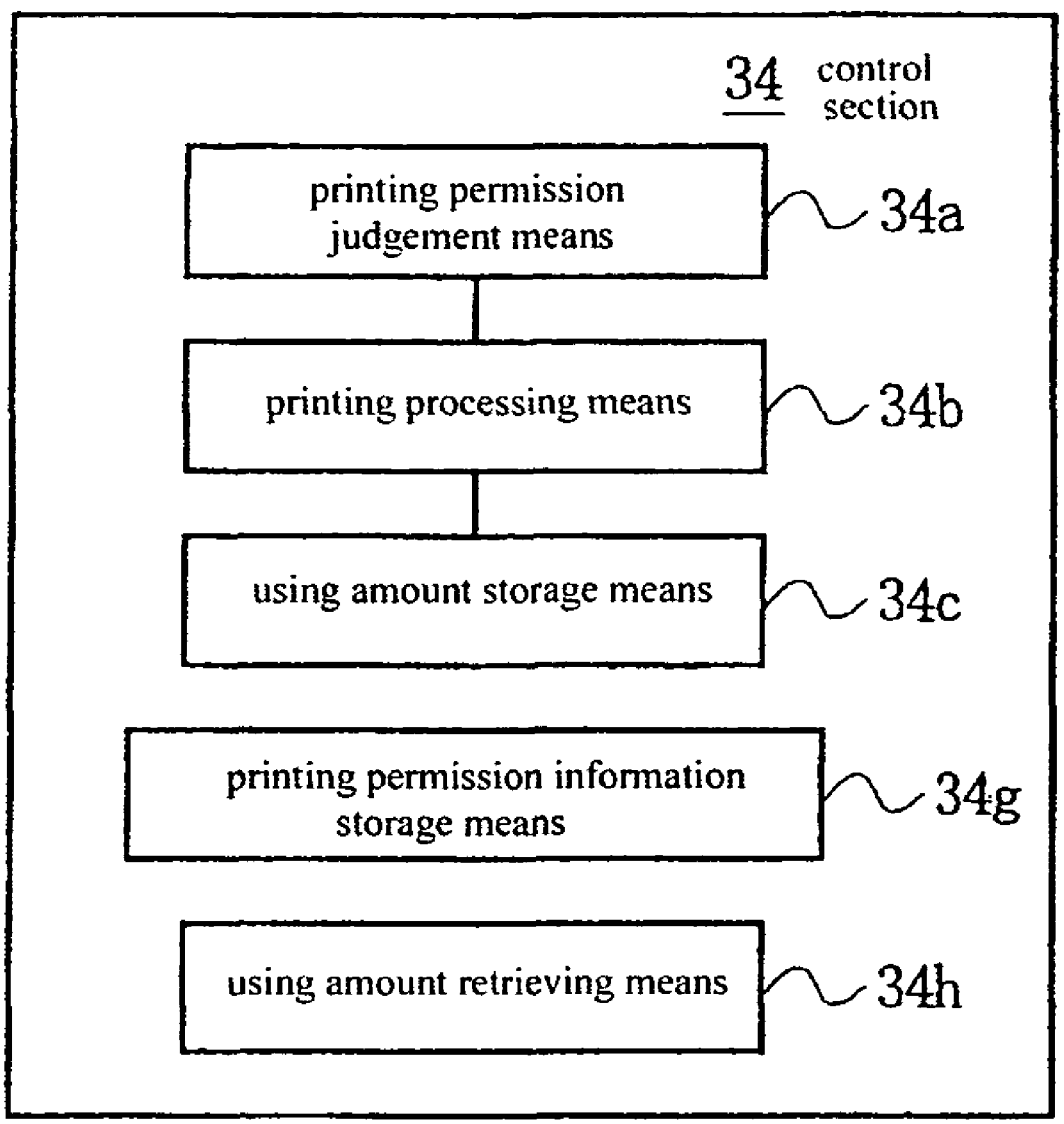
FIG. 12 is a block diagram showing a structure of a control section for the printer apparatus according to the third embodiment of this invention.

FIG. 12 is a block diagram showing a structure of the control section for the printer apparatus according to the third embodiment of this invention.

As shown in FIG. 12, from the viewpoint to the function, the control section 34 has the printing permission judgment means 34a; the printing processing means 34b for controlling the printing operation according to the printing job; the using amount storage means 34c for storing the total printing sheet number in the memory section 35; the printing permission information storage means 34g for storing the printing permission information in the memory section 35 according to the order from the administration server 60; and a using amount retrieving means, or retriever, 34h for transmitting the IP address and the total printing sheet number of the computer 20 to the administration server 60 according to the order from the server 60, thereby controlling the printing operation on the recording sheet.

The printing permission judgment means 34a makes a judgment as to the permission for the printing operation according to the printing permission judgment information in the memory section 35.

The control section 65 for the administration server 60 will be next explained from the viewpoint to the function.

Figure 13:
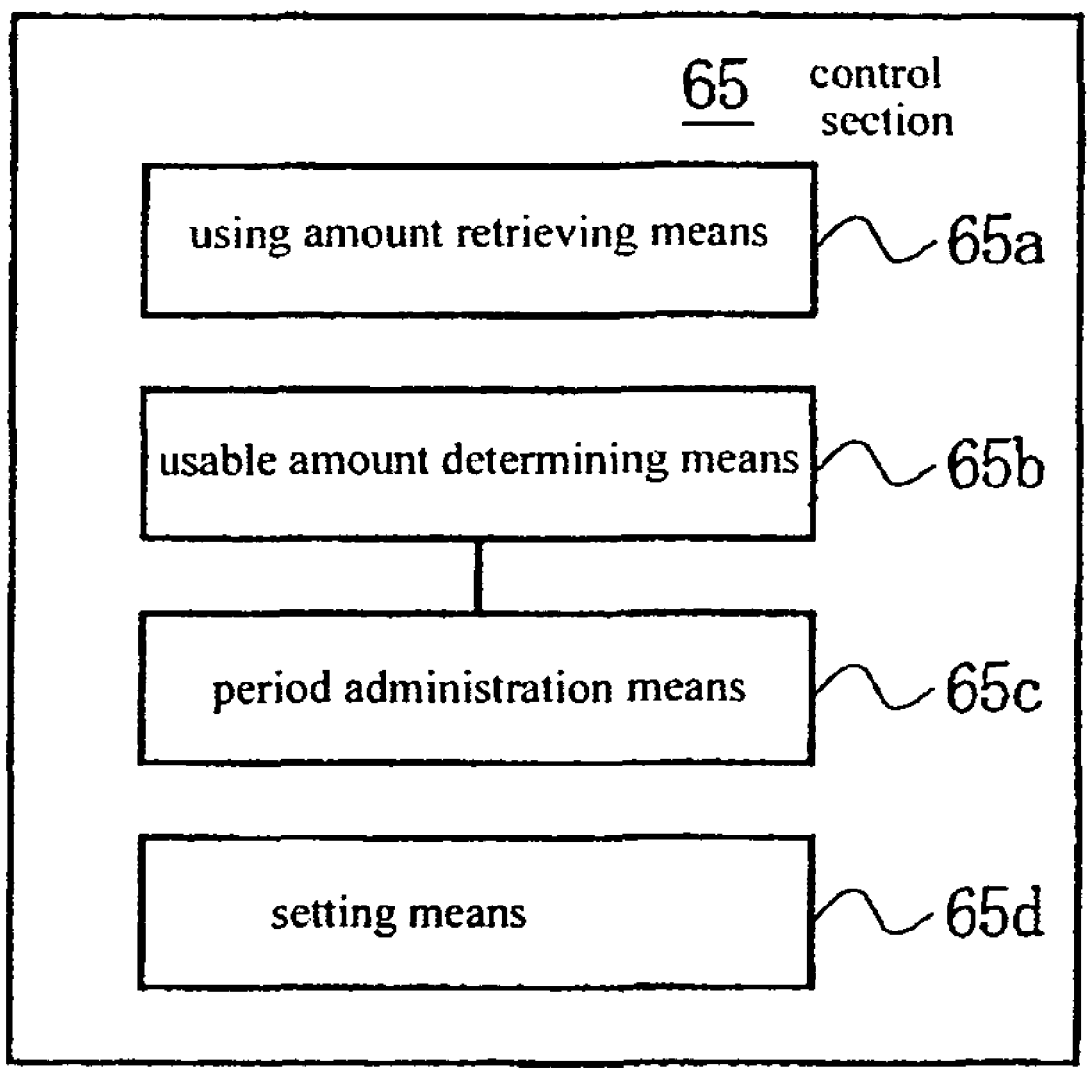
FIG. 13 is a block diagram showing a structure of a control section for an administration server according to the third embodiment of this invention.

FIG. 13 is a block diagram showing a structure of the control section for the administration server according to the third embodiment of this invention.

As shown in FIG. 13, from the viewpoint to the function, the control section 65 has a using amount retrieving means 65a, a printable amount determining means 65b, a period administration means 65c, and a setting means 65d, thereby retrieving the total printing sheet number in the printer apparatus 30, thereby controlling the permission for the printing operation.

Herein, the using amount retrieving means 65a retrieves in the printer apparatus 30 the IP addresses and the total printing sheet numbers of all of the computers 20, and then transmits to the printer apparatus 30 the order as to the permission for the printing operation according to whether the total printing sheet number reaches the printable sheet number. The printable amount determining means 65b determines the printable sheet number. The setting means 65d displays on the display 62 an after-described printable sheet number setting screen 70 for setting the printable sheet number and an after-described printer apparatus setting screen 80 for setting the printer apparatus 30 retrieving the total printing sheet number, thereby storing in the memory section 66 the state set with each screen. The period administration means 65c detects and informs the state where the next month begins to the usable amount determining means 65b.

The printable sheet number setting screen 70 displayed on the display 62 will be next explained.

Figure 14:
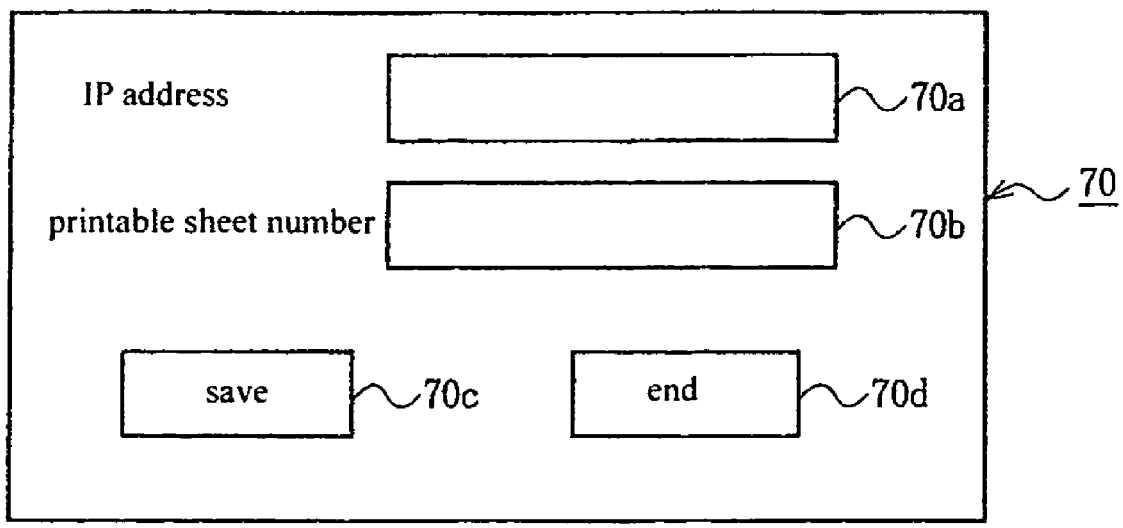
FIG. 14 is a view showing operation of a setting processing for a printable sheet number according to the third embodiment of this invention.

FIG. 14 is a view showing operation of a setting processing for a printable sheet number according to the third embodiment of this invention.

As shown in FIG. 14, the printable sheet number setting screen 70 displays an IP address column 70a for entering the IP address, a printable sheet number column 70b for entering printable sheet number, a save button 70c for saving the setting, and an end button for ending the setting.

The printer apparatus setting screen 80 displayed on the display 62 will be next explained.

Figure 15:
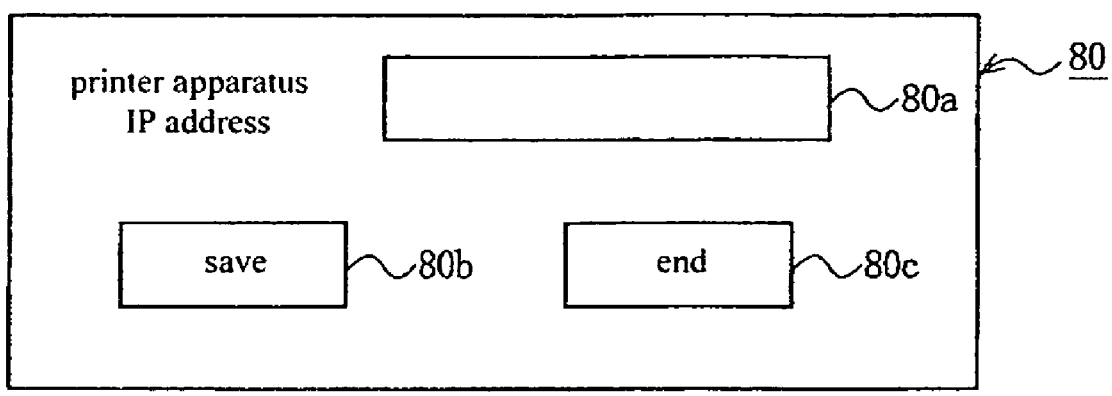
FIG. 15 is a view showing a printer apparatus setting screen according to the third embodiment of this invention.

FIG. 15 is a view showing the printer apparatus setting screen according to the third embodiment of this invention.

As shown in FIG. 15, the printer apparatus setting screen 80 displays an IP address column 80a for entering the IP address of the printer apparatus 30, a save button 80b for saving the setting, and an end button 80c for ending the setting.

Operation of the printer apparatus 30 structured like the above will be next explained. The operation is first explained, where the administration server 60 sets the IP address for the printer apparatus 30 retrieving the total printing sheet number.

Figure 16:
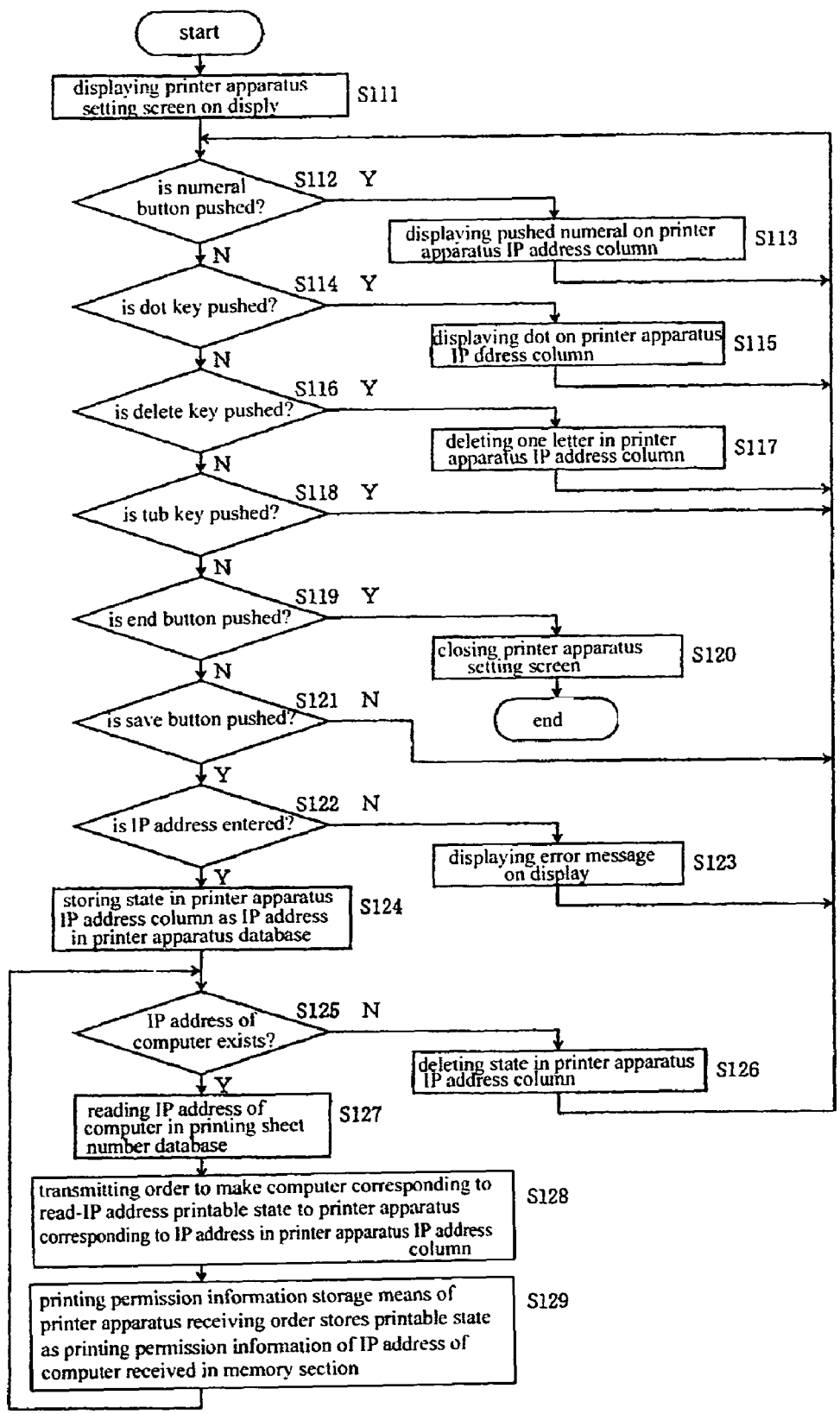
FIG. 16 is a flow chart showing operation for setting an IP address of the printer apparatus retrieving a total printing sheet number according to the third embodiment of this invention.

FIG. 16 is a flow chart showing the operation for setting the IP address for the printer apparatus retrieving the total printing sheet number according to the third embodiment of this invention.

Where the administrator selects a function for setting the IP address for the printer apparatus 30 retrieving the total printing sheet number, the administration server 60 displays the printer apparatus setting screen 80 on the display 62. Where the numeral key is pushed, the administration server 60 displays the pushed numeral in the printer apparatus IP address column 80a. Where the dot key is pushed, the administration server 60 displays the dot is made in the printer apparatus IP address column 80a. Where the delete key is pushed, the administration server 60 deletes one letter in the printer apparatus IP address column 80a.

The administration server 60, subsequently, makes a judgment as to whether the tub key is pushed, thereby making the judgment as to whether the end button 80c is pushed in a case where the tub key is not pushed. The administration server 60 closes the printer apparatus setting screen 80 when the end button 80c is pushed. When the save button 80b is pushed, the administration server 60 makes a judgment as to whether the printer apparatus IP address column 80a is entered. Where nothing is entered in the printer apparatus IP address column 80a, the administration server 60 displays the error message on the display 62. Where the printer apparatus IP address column 80a is entered, the administration server 60 stores in the printer apparatus data base 66b the state entered in the printer apparatus IP address column 80a, thereby repeating the above-described operation as many times as the number of the IP addresses of the computers 20 stored in the printing sheet number database 66a, thereby deleting the state in the printer apparatus IP address column 80a.

The administration server 60 subsequently reads the IP address of the computer 20 in the printing sheet number database 66a to transmit an order to make the computer 20 corresponding to the read IP address printable to the printer 30 apparatus corresponding to the IP address entered in the printer apparatus IP address column 80a. The printing permission information storage means 34g of the control section 34 for the printer apparatus 30 receives through the input/output interface 31 the order to make the IP address of the computer 20 the printable state, thereby storing in the memory section 35 the printable state as the printing permission information of the IP address.

A flow chart is hereinafter explained. The administration server 60 displays the printer apparatus setting screen 80 on the display 62 at the step S111. The judgment is made at the step S112 as to whether the numeral key is pushed. Where the numeral key is pushed, the operation goes to the step S113 while where the numeral key is not pushed, the operation goes to the step S114. The administration server 60 displays the pushed numeral in the printer apparatus IP address column 80a at the step S113. The judgment is made at the step S114 as to whether the dot key is pushed. Where the dot key is pushed, the operation goes to the step S115 while where the dot key is not pushed, the operation goes to the step S116. The administration server 60 displays the dot in the printer apparatus IP address column 80a at the step S115. The judgment is made at the step S116 as to whether the delete key is pushed. Where the delete key is pushed, the operation goes to the step S117 while where the delete key is not pushed, the operation goes to the step S118. The administration server deletes one letter in the printer apparatus IP address column 80a at the step S117. The judgment is made at the step S118 as to whether the tub key is pushed. Where the tub key is pushed, the operation returns to the step S112 while where the tub key is not pushed, the operation goes to the step S119. The judgment is made at the step S119 as to whether the end button 80c is pushed. Where the end button 80c is pushed, the operation goes to the step S120 while where the end button 80c is not pushed, the operation goes to the step S121. The administration server 60 closes the printer apparatus setting screen 80 and makes this processing over at the step S120. The judgment is made at the step S121 as to whether the save button 80b is pushed. Where the save button 80b is pushed, the operation goes to the step S122 while where the save button 80b is not pushed, the operation returns to the step S112. The judgment is made at the step 122 as to whether the IP address is entered. Where the IP address is not entered, the operation goes to the step S123 while where the IP address is entered, the operation goes to the step S124. The administration server 60 displays the error message on the display 62 at the step S123. The administration server 60 stores in the printer apparatus database 66b the state in the printer apparatus IP address column 80a as the IP address at the step S124. The judgment is made at the step S125 as to whether any other IP address of the computer 20 not yet read exists in the printing sheet number database 66a. Where other IP address of the computer 20 exists, the operation goes to the step S127 while no more IP address of the computer 20 exists, the operation goes to the step S126. The administration server 60 deletes the state in the printer apparatus IP address column 80a at the step S126. The administration server 60 reads the IP address of the computer 20 in the printing sheet number database 66a at the step S127. At the step S128, the administration server 60 transmits the order to make the computer 20 corresponding to the read IP address printable to the printer apparatus 30 corresponding to the IP address entered in the printer apparatus IP address column 80a. At the step S129, the printing permission information storage means 34g of the printer apparatus 30 already receiving the order stores the printable state as the printing permission information of the IP address of the computer 20 received by the memory section 35, and returns to the step S125.

Operation where the administration server 60 sets the printable sheet number for each computer 20, will be next explained.

Figure 17:
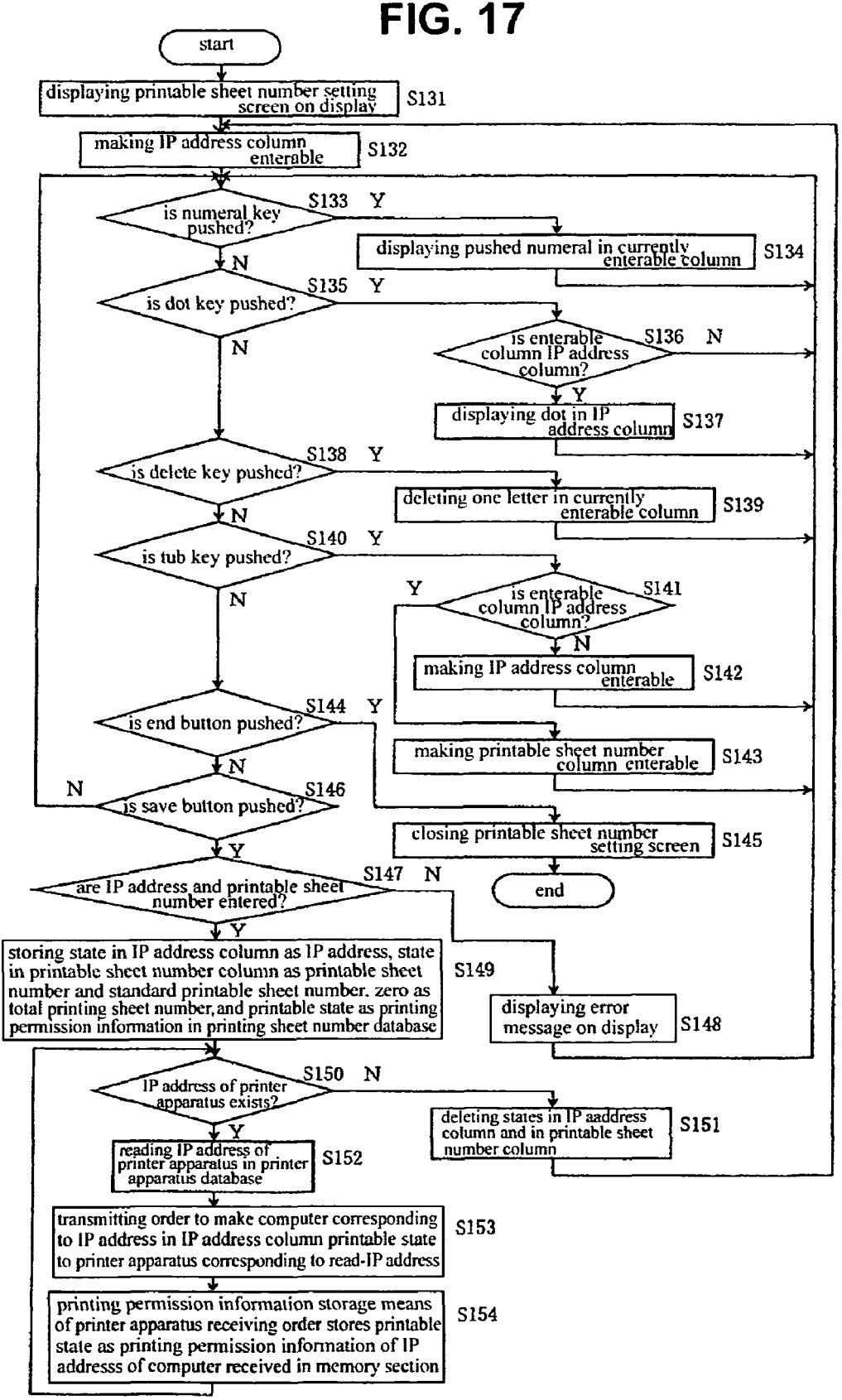
FIG. 17 is a flow chart showing operation for setting a printable sheet number for each computer according to the third embodiment of this invention.

FIG. 17 is a flow chart showing the operation for setting the printable sheet number for each computer according to the third embodiment of this invention.

Where the administrator selects a function for setting the printable sheet number, the administration server 60 displays the printable sheet number setting screen 70 on the display 62. The administration server 60 makes the IP address column 70a enterable, thereby displaying the pushed numeral in the currently enterable column in a case where the numeral key is pushed. Where the dot key is pushed, the administration server 60 makes a judgment as to whether the currently enterable column is the IP address column 70a, thereby displaying the dot in a case where the currently enterable column is the IP address column 70a. Where the delete key is pushed, the administration server 60 deletes one letter in the currently enterable column.

Where the tub key is pushed, the administration server 60 subsequently makes a judgment as to whether the currently enterable column is the IP address column 70a, thereby making the printable sheet number column 70b enterable in a case where the currently enterable column is the currently enterable column is the IP address column 70a. Where the currently enterable column is the printable sheet number column 70b, the administration server 60 makes the IP address column 70a enterable. Where the end button 70d is pushed, the administration server 60 closes the printable sheet number setting screen 70 and makes this processing over. Where the save button 70c is pushed, the administration server 60 makes a judgment as to whether either the IP address column 70a or the printable sheet number column 70b is entered, thereby displaying the error message on the display 62 in a case where the neither the IP address column 70a nor the printable sheet number column 70b is not entered.

Where both of the IP address column 70a and the printable sheet number 70b are entered, the administration server 60 respectively stores in the printing sheet number data base 66a the state in the IP address column 70a as the IP address, the state in the printable sheet number 70b as the printable sheet number and the standard printable sheet number, zero as the total printing sheet number, and the printable state as the printing permission information. The administration server 60 subsequently repeats the above-described operation as many times as the number of the IP addresses of the printer apparatuses 30 stored in the printer apparatus database 66b, thereby deleting the states in the IP address column 70a and the printable sheet number column 70b.

The administration server 60 subsequently reads the IP address of the printer apparatus 30 in the printer apparatus database 66b and transmits to the printer apparatus 30 corresponding to the IP address the order to make the computer 20 corresponding to the IP address entered in the IP address column 70a printable. The printing permission information storage means 34g of the control section 34 for the printer apparatus 30 receives through the input/output interface 31 the order to make the IP address of the computer 20 the printable state and then stores in the memory section 35 the printable state as the printing permission information of the IP address.

A flow chart is hereinafter explained. The administration server 60 displays the printable sheet number setting screen 70 on the display 62 at the step S131. The administration server 60 makes the IP address column 70a enterable at the step S132. The judgment is made at the step S133 as to whether the numeral key is pushed. Where the numeral key is pushed, the operation goes to the step S134 while the numeral key is not pushed, the operation goes to the step S135. The administration server 60 displays the pushed numeral in the currently enterable column at the step S134. The judgment is made at the step S135 as to whether the dot key is pushed. Where the dot key is pushed, the operation goes to the step S136 while where the dot key is not pushed, the operation goes to the step S138. The judgment is made at the step S136 as to whether the enterable column is the IP address column 70a. Where the enterable column is the IP address column 70a, the operation goes to the step S137 while where the enterable column is not the IP address column 70a, the operation returns to the step S133. The administration server 60 displays the dot in the IP address column 70a at the step S137. The judgment is made at the step S138 as to whether the delete key is pushed. Where the delete key is pushed, the operation goes to the step S139 while where the delete key is not pushed, the operation goes to the step S140. The administration server 60 deletes one letter in the currently enterable column at the step S139. The judgment is made at the step S140 as to whether the tub key is pushed. Where the tub key is pushed, the operation goes to the step S141 while where the tub key is not pushed, the operation goes to the step S144. The judgment is made at the step S141 as to whether the enterable column is the IP address column 70a. Where the enterable column is the IP address column, the operation goes to the step S143 while where the enterable column is not the IP address column, the operation goes to the step S142. The administration server 60 makes the IP address column 70a enterable at the step S142. The administration server makes the printable sheet number column 70b enterable at the step S143. The judgment is made at the step S144 as to whether the end button 70d is pushed. Where the end button 70d is pushed, the operation goes to the step S145 while where the end button is not pushed, the operation goes to the step S146. The administration server 60 closes the printable sheet number setting screen 70a and makes this processing over at the step S145. The judgment is made at the step S146 whether the save button 70c is pushed. Where the save button 70c is pushed, the operation goes to the step S147 while where the save button 70c is not pushed, the operation returns to the step S133. The judgment is made at the step S146 as to whether both of the IP address and the printable sheet number are entered. Neither the IP address nor the printable sheet number is entered, the operation goes to the step S148 while where the both of the IP address and the printable sheet number are entered, the operation goes to the step S149. The administration server 60 displays the error message on the display 62 at the step S148. At the step S149, The administration server 60 stores in the printing sheet number database 66a the state in the IP address column 70a as the IP address, the state in the printable sheet number column 70b as the printable sheet number and the standard printable sheet number, zero as the total printing sheet number, and the printable state as the printing permission information. The judgment is made at the step S150 as to whether any other IP address of the printer apparatus 30 not yet read exists in the printer apparatus database 66b. Where other IP address of the printer apparatus 30 exists, the operation goes to the step S152 while where no more IP address for the printer apparatus 30 exists, the operation goes to the step S151. The administration server 60 deletes the states in the IP address column 70a and the printable sheet number column 70b at the step S151. The administration server 60 reads the IP address of the printer apparatus 30 in the printer apparatus database 66b at the step S152. At the step S153, the administration server 60 transmits the order to make the computer 20 corresponding to the IP address in the IP address column 70a printable to the printer apparatus 30 corresponding to the read IP address. At the step S154, the printing permission information storage means 34g of the printer apparatus 30 already receiving the order stores the printable state as the printing permission information of the IP address of the computer received by the memory section 65.

Operation where the computer 20 transmits the IP address and the printing job through the network 10 to the printer apparatus 30, will be next explained.

Figure 18:
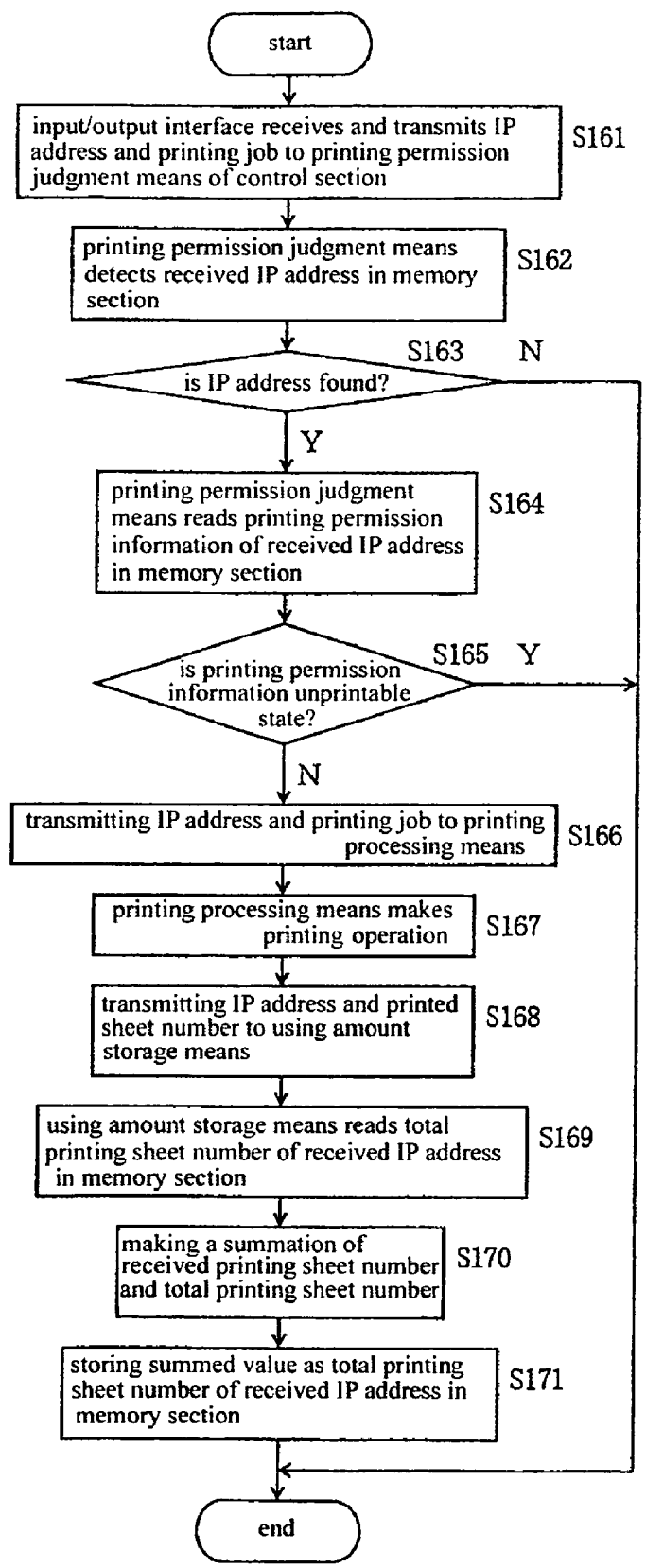
FIG. 18 is a flow chart showing operation in a case of receipt of a printing job according to the third embodiment of this invention.

FIG. 18 is a flow chart showing the operation in a case of receipt of the printing job according to the third embodiment of this invention.

The input/output interface 31 receives and transmits the IP address and the printing job to the printing permission judgment means 34a. The printing permission judgment means 34a receives and detects the IP address in the memory section 35, thereby making a judgment as to whether the IP address is found. Where the IP address is found, the printing permission judgment means 34a reads the printing permission information of the IP address in the memory section 35.

Where the printing permission information read by the printing permission judgment 34a is the printable state, the printing permission judgment means 34a transmits the received IP address and the printing job to the printing processing means 34b. The printing processing means 34b makes the printing operation of the received printing job, thereby transmitting the printed sheet number and the received IP address to the using amount storage means 34c.

The using amount storage means 34c reads in the memory section 35 the total printing sheet number of the received IP address, thereby making a summation of the received printed sheet number and the total printing sheet number to store the summed value as the total printing sheet number of the received IP address in the memory section 35.

A flow chart is hereinafter explained. The input/output interface receives and transmits the IP address and the printing job to the printing permission judgment means 34a of the control section 34 at the step S161. The printing permission judgment means 34a receives and detects the IP address in the memory section 35. The judgment is made at the step S163 as to whether the IP address is found. Where the IP address is found, the operation goes to the step S164 while where the IP address is not found, this processing ends. At the step S164, the printing permission judgment means 34a reads in the memory section 35 the printing permission information of the received IP address. The judgment is made at the step S165 as to whether the printing permission information is the unprintable state. Where the printing permission information is the unprintable state, this processing ends while where the printing permission information is the printable state, the operation goes to the step S166. The printing permission judgment means 34a transmits the IP address and the printing job to the printing processing means 34b at the step S166. The printing processing means 34b makes the printing operation at the step S167. The printing processing means 34b transmits the IP address and the printed sheet number to the using amount storage means 34c at the step S168. At the step S169, the using amount storage means 34c reads in the memory section 35 the total printing sheet number of the received IP address. The using amount storage means 34c makes a summation of the received printed sheet number and the total printing sheet number at the step S170. The using amount storage means 34c stores the summed value as the total printing sheet number of the received IP address in the memory section 35 and makes this processing over at the step S171.

Operation where the administration server 60 retrieves in the printer apparatus 30 the total printing sheet number of each computer 20, will be next explained.

Figure 19:
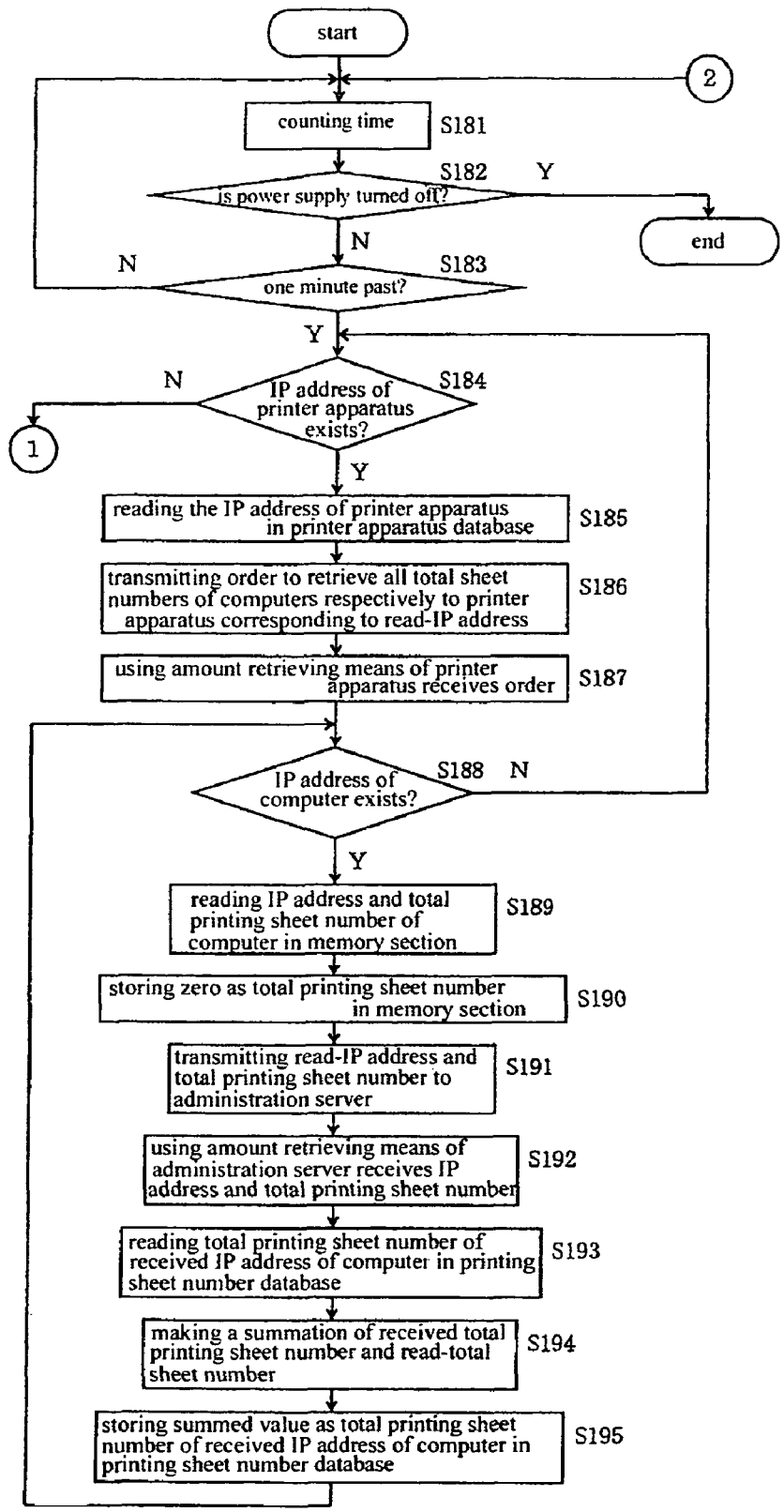
FIG. 19 is a first flow chart showing operation for retrieving the total printing sheet number according to the third embodiment of this invention.
Figure 20:
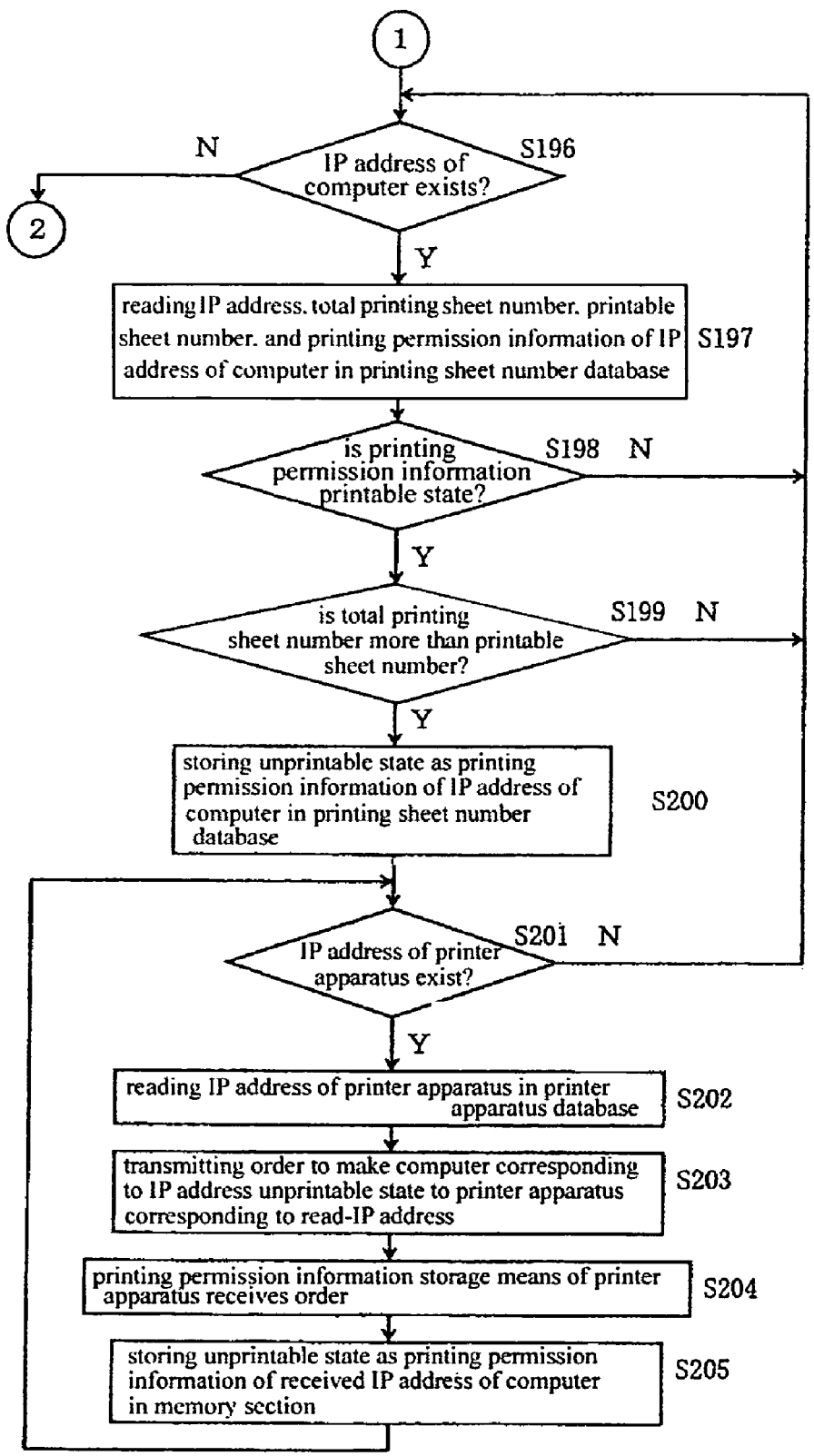
FIG. 20 is a second flow chart showing the operation for retrieving the total printing sheet number according to the third embodiment of this invention.

FIG. 19 is a first flow chart showing the operation for retrieving the total printing sheet number according to the third embodiment of this invention, and FIG. 20 is a second flow chart showing the operation for retrieving the total printing sheet number according to the third embodiment of this invention.

Where the power supply of the administration server 60 is turned on, the using amount retrieving means 65a counts time, thereby confirming the state where the power supply is not turn off. It is to be noted that where the power supply is turned off, this processing ends. When one minute past, the using amount retrieving means 65a repeats after-described operation as many times as the number of IP addresses of the printer apparatuses 30 stored in the printer apparatus database 66b. The using amount retrieving means 65a reads in the printer apparatus database 66b the IP address of the printer apparatus 30, thereby transmitting to the printer apparatus corresponding to the IP address the order to retrieve all of the total printing sheet numbers of the computers 20 respectively. The using amount retrieving means 34h of the printer apparatus 30, subsequently, receives through the input/output interface 31 the order to retrieve all of the total printing sheet numbers of the computers 20 respectively, thereby repeating after-described operation as many times as the number of the IP addresses for the computers 20 stored in the memory section 35.

The using amount retrieving means 34h subsequently reads in the memory section 35 the total printing sheet number of the IP address of the computer 20, thereby storing zero as the total printing sheet number, thereby transmitting the IP address and the total printing sheet number to the administration server 60. After receiving through the input/output interface 61 the IP address and the total printing sheet number, the using amount retrieving means 65a of the administration server 60 reads in the printing number database 66a the total printing sheet number of the IP address, thereby making a summation of the received total printing sheet number and the read total printing sheet number, thereby storing the summed value as the total printing sheet number of the IP address in the printing sheet number database 66a. The using amount retrieving means 65a of the administration server 60 then repeats after-described operation as many times as the number of the IP addresses of the computers 20 stored in the printing sheet number database 66a.

The using amount retrieving means 65a subsequently reads in the printing sheet number database 66a the total printing sheet number of the IP address of the computer 20, the printable sheet number, and the printing permission information. Where the printing permission information is the printable state, the using amount retrieving means 65a compares the total printing sheet number with the printable sheet number to make a judgment as to whether the total printing sheet number is more than the printable sheet number. Herein, where the total printing sheet number is more than the printable sheet number, the using amount retrieving means 65a stores in the printing sheet number database 66a the unprintable state as the printing permission information of the IP address of the computer 20, thereby repeating after-described operation as many times as the number of the IP addresses of the printer apparatuses 30 stored in the printer apparatus database 66b.

The using amount retrieving means 65a subsequently reads in the printer apparatus database 66b the IP address of the computer 20, thereby transmitting to the printer apparatus 30 corresponding to the IP address the order to make the IP address of the computer 20 the unprintable state. After receiving through the input/output interface 31 the order to make the IP address of the computer 20 the unprintable state, the printing permission information storage means 34g of the printer apparatus 30 stores in the memory section 35 the unprintable state as the printing permission information of the IP address.

A flow chart is hereinafter explained. The using amount retrieving means 65a counts time at the step S181. The judgment is made at the step S182 as to whether the power supply is turned off. Where the power supply is turned off, this processing ends while where the power supply is not turned off, the operation goes to the step S183. The judgment is made at the step S183 as to whether one minute past. Where one minute past, the operation goes to the step S184 while where one minute does not pass yet, the operation returns to the step S181. The judgment is made at the step S184 as to whether any other IP address of the printer apparatus not yet read exists in the printer apparatus database 66b. Where other IP address of the printer apparatus not yet read exists, the operation goes to the step S185 while where no more IP address of the printer apparatus not yet read exists, the operation goes to the step S196. The using amount retrieving means 65a reads the IP address of the printer apparatus in the printer apparatus database 66b at the step S185. The using amount retrieving means 65a transmits the order to retrieve all of the total printing sheet numbers of the computers 20 respectively to the printer apparatus 30 corresponding to the read IP address at the step S186. The using amount retrieving means 34h of the printer apparatus 30 receives at the step S187 the order to retrieve all of the total printing sheet numbers of the computers 20 respectively. The judgment is made at the step S188 as to whether any other IP address of the computer 20 not yet read exists in the memory section 35. Where other IP address of the computer 20 not yet read exists, the operation goes to the step S189 while where no more IP address of the computer exists, the operation returns to the step S184. The using amount retrieving means 34h reads the IP address and the total printing sheet number of the computer 20 in the memory section 35 at the step S189. The using amount retrieving means 34h stores zero as the total printing sheet number in the memory section 35 at the step S190. The using amount retrieving means 34h transmits the read IP address and the total printing sheet number to the administration server 60 at the step S191. The using amount retrieving means 65a of the administration server 60 receives at the step S192 the IP address and the total printing sheet number. The using amount retrieving means 65a reads at the step S193 the total printing sheet number of the IP address of the computer 20 received from the printing sheet number database 66a. The using amount retrieving means 65a makes a summation of the received total sheet number and the read total sheet number at the step S194. At the step S195, the using amount retrieving means 65a stores the summed value as the total printing sheet number of the received IP address of the computer 20 in the printing sheet number database 66a. The judgment is made at the step S196 as to whether any other IP address of the computer 20 not yet read exists in the printing sheet number database 66a. Where other IP address of the computer 20 exists, the operation goes to the step S197 while where no more IP address of the computer 20 exists, the operation returns to the step S181. At the step S197, the using amount retrieving means 65a reads the total printing sheet number, the printable sheet number, and the printing permission information of the IP address of the computer 20 in the printing sheet number database 66a. The judgment is made at the step S198 as to whether the printing permission information is the printable state. Where the printing permission information is the printable state, the operation goes to the step S199 while where the printing permission information is not the printable state, the operation returns to the step S196. The judgment is made at the step S199 as to whether the total printing sheet number is more than the printable sheet number. Where the total printing sheet number is more than the printable sheet number, the operation goes to the step S200 while the total printing sheet number is not more than the printable sheet number, the operation returns to the step S196. The using amount retrieving means 65a stores at the step S200 the unprintable state as the printing permitting information of the IP address of the computer 20 in the printing sheet number database 66a. The judgment is made at the step S201 as to whether any other IP address of the printer apparatus 30 not yet read exists in the printer apparatus database 66b. Where other IP address of the printer apparatus 30 exists, the operation goes to the step S202 while where no more IP address of the printer apparatus 30 exists, the operation returns to the step S196. At the step S202, the using amount retrieving means 65a retrieves the IP address of the printer apparatus 30 in the printer apparatus database 66b. The using amount retrieving means 65a transmits at the step S203 the order to make the computer 20 corresponding to the IP address the unprintable state to the printer apparatus 30 corresponding to the read IP address. The printing permission information storage means 34g of the printer apparatus 30 receives at the step S204 the order to make the IP address of the computer 20 the unprintable state. At the step S205, the printing permission information storage means 34g of the printer apparatus 30 stores the unprintable state as the printing permission information of the IP address of the computer 20 received by the memory section 35.

Operation when the predetermined period (set to one month in this embodiment) past, will be next explained.

Figure 21:
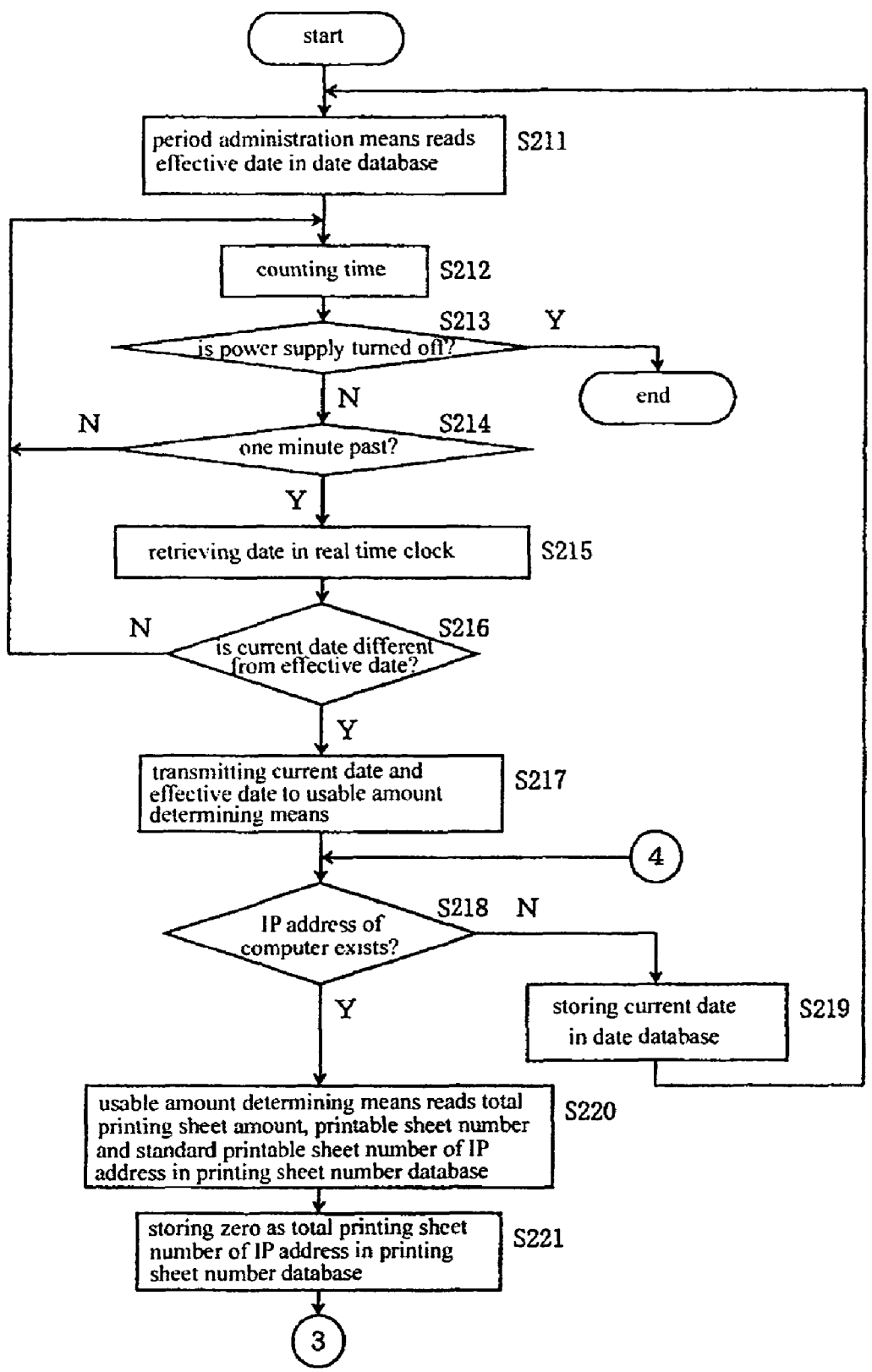
FIG. 21 is a first flow chart showing operation in a case where a predetermined period past according to the third embodiment of this invention.
Figure 22:
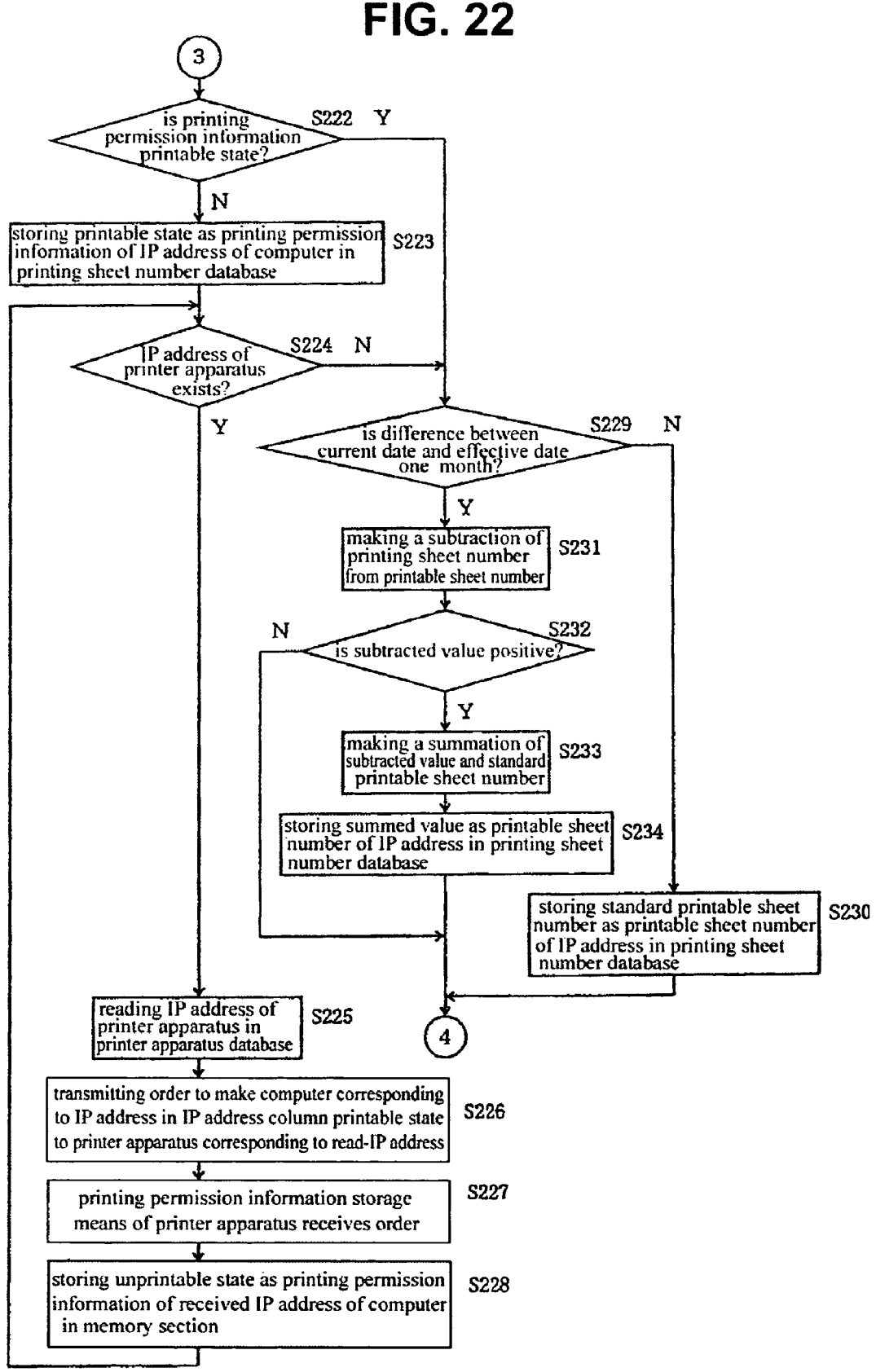
FIG. 22 is a second flow chart showing the operation in a case where the predetermined period past according to the third embodiment of this invention.

FIG. 21 is a first flow chart showing the operation in a case where the predetermined period past according to the third embodiment of this invention, and FIG. 22 is a second flow chart showing the operation in a case where the predetermined period past according to the third embodiment of this invention.

When the power supply of the administration server 60 is turned on, the period administration means 65c reads in the date database 66c the effective date, thereby counting time thereby confirming that the power supply is not turned off, and then inquires the real time clock 64 for time in a case where one minute past. Where the current date is different from the effective date, the period administration means 65c transmits the current date and the effective date to the usable amount determining means 65b.

The usable amount determining means 65b, subsequently, repeats after-described operation as many times as the number of the IP addresses of the computers 20 stored in the printing sheet database 66a. Where no more IP address of the computer 20 not yet read exists in the printing sheet number database 66a, the usable amount determining means 65b stores the current date in the date database 66c. On the other hand, where other IP address of the computer 20 not yet read exists in the printing sheet number database 66a, the usable amount determining means 65b reads in the printing sheet number database 66a the total printing sheet number, the printable sheet number, and the standard printable sheet number of the IP address fir the computer, thereby storing zero as the total printing sheet number. Where the printing permission information is the unprintable state, the usable amount determining means 65b stores in the printing sheet number database 66a the printable state as the printing permission information of the IP address of the computer 20, thereby repeating after-described operation as many times as the number of the IP addresses of the printer apparatuses 30 stored in the printing apparatus database 66b.

The usable amount determining means 65b reads in the printer apparatus database 66b the IP address of the printer apparatus 30, thereby transmitting the order to make the IP address of the computer 20 the printable state to the printer apparatus 30 corresponding to the IP address. After receiving through the input/output interface 31 the order to make the IP address of the computer 20 the printable state, the printing permission information storage means 34g of the printer apparatus 30 stores in the memory section 35 the printable state as the printing permission information of the IP address.

The usable amount determining means 65b, subsequently, compares the current date with the effective date, thereby storing the standard printable sheet number as the printable sheet number of the IP address in the printing sheet number database 66a in a case where more than two months exists as the difference. Where the difference between the current date and the effective date is one month, the usable amount determining means 65b makes a subtraction of the total printing sheet number from the printable sheet number. Where the subtracted value is positive, the usable amount determining means 65b makes a summation of the subtracted value and the standard printable sheet number, thereby storing in the printing sheet number database 66a the summed value as the printable sheet number of the IP address.

A flow chart is hereinafter explained. The period administration means 65c reads the effective date in the date database 66c at the step S211. The period administration means 65c counts time at the step S212. The judgment is made at the step S213 as to whether the power supply is turned off. Where the power supply is turned off, this processing ends while the power supply is not turned off, the operation goes to the step S214. The judgment is made at the step S214 as to whether one minute past. Where one minute past, the operation goes to the step S215 while one minute does not past yet, the operation returns to the step S212. The period administration means 65c retrieves the date in the real time clock 64 at the step S215. The judgment is made at the step S216 as to whether the current date is different from the effective date. Where the current date is different from the effective date, the operation goes to the step S217 while where the current date is not different from the effective date, the operation returns to the step S212. The period administration means 65c transmits the current date and the effective date to the usable amount determining means 65b at the step S217. The judgment is made at the step S218 as to whether any other IP address of the computer 20 not yet read exists in the printing sheet number database 66a. Where other IP address of the computer 20 exists, the operation goes to the step S220 while where no more IP address of the computer 20 exists, the operation goes to the step S219. The using amount determining means 65b stores the current date in the date database 66c at the step S219. The usable amount determining means 65b reads in the printing sheet number database 66a the total printing sheet number, the printable sheet number, and the standard printable sheet number of the IP address at the step S220. The usable amount determining means 65b stores zero as the total printing sheet number of the IP address in the printing sheet number database 66a at the step S221. The judgment is made at the step S222 as to whether the printing permission information is the printable state. Where the printing permission information is the printable state, the operation goes to the step S229 while where the printing permission information is not the printable state, the operation goes to the step S223. The usable amount determining means 65b stores the printable state as the printing permission information of the IP address of the computer 20 in the printing sheet number database 66a at the step S223. The judgment is made at the step S224 as to whether any other IP address of the printer apparatus 30 not yet read exists in the printer apparatus database 66b. Where other IP address of the printer apparatus 30 exists, the operation goes to the step S225 while where no more IP address of the printer apparatus 30 exists, the operation goes to the step S229. The usable amount determining means 65b reads the IP address of the printer apparatus in the printer apparatus database 66b at the step S225. The usable amount determining means 65b transmits the order to make the computer 20 corresponding to the IP address the printable state to the printer apparatus 30 corresponding to the IP address at the step S226. The printing permission information storage means 34g of the printer apparatus 30 receives the order at the step S227. The judgment is made at the step S229 as to whether the difference between the current date and the effective date is one month. Where the difference between the current date and the effective date is one month, the operation goes to the step S231 while where the difference between the current date and the effective date is not one month, the operation goes to the step S230. The usable amount determining means 65b stores the standard printable sheet number is as the printable sheet number of the IP address in the printing sheet number database 66a at the step S230. The printable amount determining means 65b makes a subtraction of the printing sheet number from the printable sheet number at the step S231. The judgment is made at the step S232 as to whether the subtracted value is positive. Where the subtracted value is positive, the operation goes to the step S233 while where the subtracted value is not positive, the operation returns to the step S218. The usable amount determining means 65b makes a summation of the subtracted value and the standard printable sheet number at the step S233. The usable amount determining means 65b stores the summed value as the printable sheet number of the IP address in the printing sheet number database 66a at the step S234.

According to this embodiment, like the above, it is possible to set the printable sheet numbers of the computer 20 respectively for all of the printer apparatuses 30, and the monthly surplus sheet number is automatically added to the printable sheet number for the next month within each computer 20. Therefore, all of the printer apparatuses 30 can obtain the effect of the first embodiment for each computer 20, and further, it is possible to cope with a case where the particular computer dominates the printing operation.

The forth embodiment according to this invention will be next explained. Structured same as the first, the second, and the third embodiments is assigned same numeral to omit corresponding explanation. Explanation for the same operation and effect as the first, the second and the third embodiments is also omitted.

Figure 23:
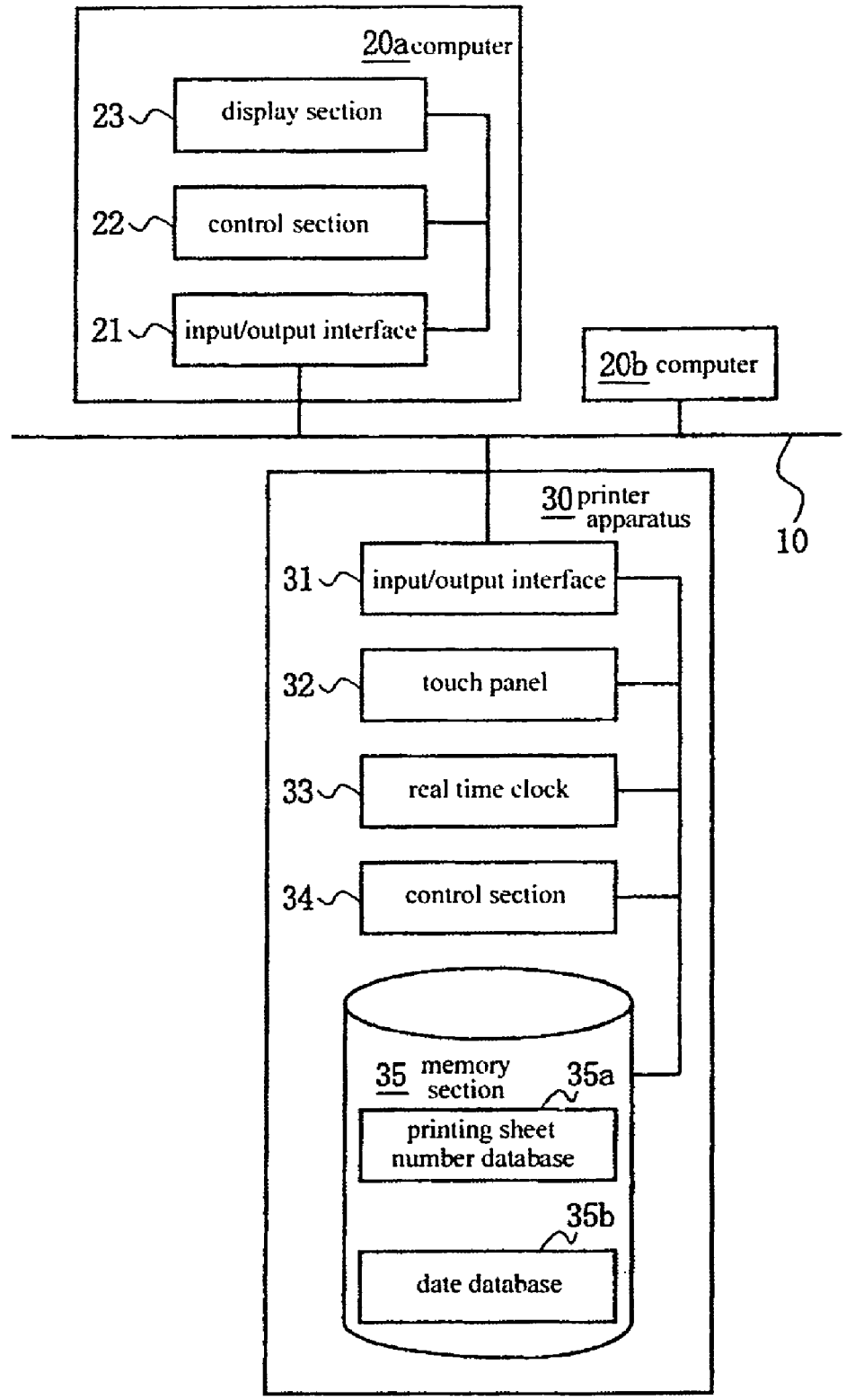
FIG. 23 is a flow chart showing a structure of an image forming system according to the forth embodiment of this invention.

FIG. 23 is a flow chart showing a structure of the image forming system according to the fourth embodiment of this invention.

As shown in FIG. 23, the network 10 interfaces as communicable one another the computer 20a, the computer 20b, and the printer apparatus 30 as the image forming apparatus. The computer 20a and the computer 20b have, from the viewpoint to the function, the input/output interface 21, the control section 22, and a display section 23, thereby transmitting the IP address as the user identification information and the printing job as the image forming data to the printer apparatus 30.

The input/output interface 21 transmits the printing job as well as receives an informing message from the printer apparatus 30 while the display section 23 displays the informing message. The control section 22 makes and transmits through the input/output interface21 the printing job, and controls to display the informing message received by the input/output interface 21 on the display section 23. An input/output interface 31 of the printer apparatus 30 receives the IP address and the printing job through the network 10. The printing sheet number database 35*a* of the memory section 35 is an area for storing the IP address, the total printing sheet number, the printable sheet number, and a remaining notice sheet number for each IP address.

The setting screen displayed on the touch panel 32 will be next explained.

Figure 24:
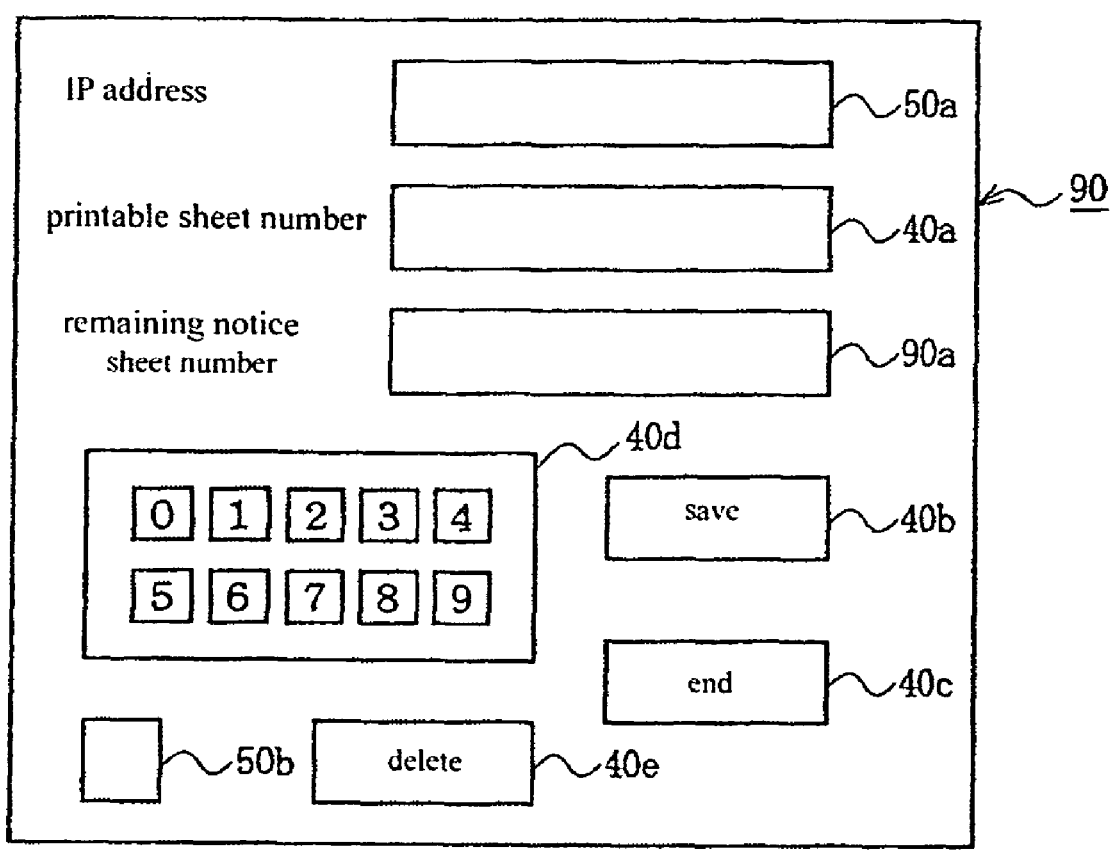
FIG. 24 is a view showing a setting screen according to the fourth embodiment of this invention.

FIG. 24 is a view showing the setting screen according to the fourth embodiment of this invention.

As shown in FIG. 24, a setting screen 90 has the IP address column 50*a* for entering the IP address operating the setting; the printable sheet number column 40*a* for entering the printable sheet number; a remaining notice sheet number 90*a* for entering the remaining notice sheet number; the save button for saving the setting; the end button 40*c* for ending the setting; the numeral buttons 40*d* for entering numerals from zero to nine; the dot button 50*b* for entering the dot in the IP address; and the delete button 40*e* for deleting one letter. Where the IP address column 50*a*, the printable sheet number column 40*a*, and the remaining notice sheet number becomes enterable by being touched. The IP address column 50*a* initially becomes enterable when the screen is displayed.

Structure of the control section 34 for the printer apparatus 30 will be next explained from the viewpoint to the function.

Figure 25:
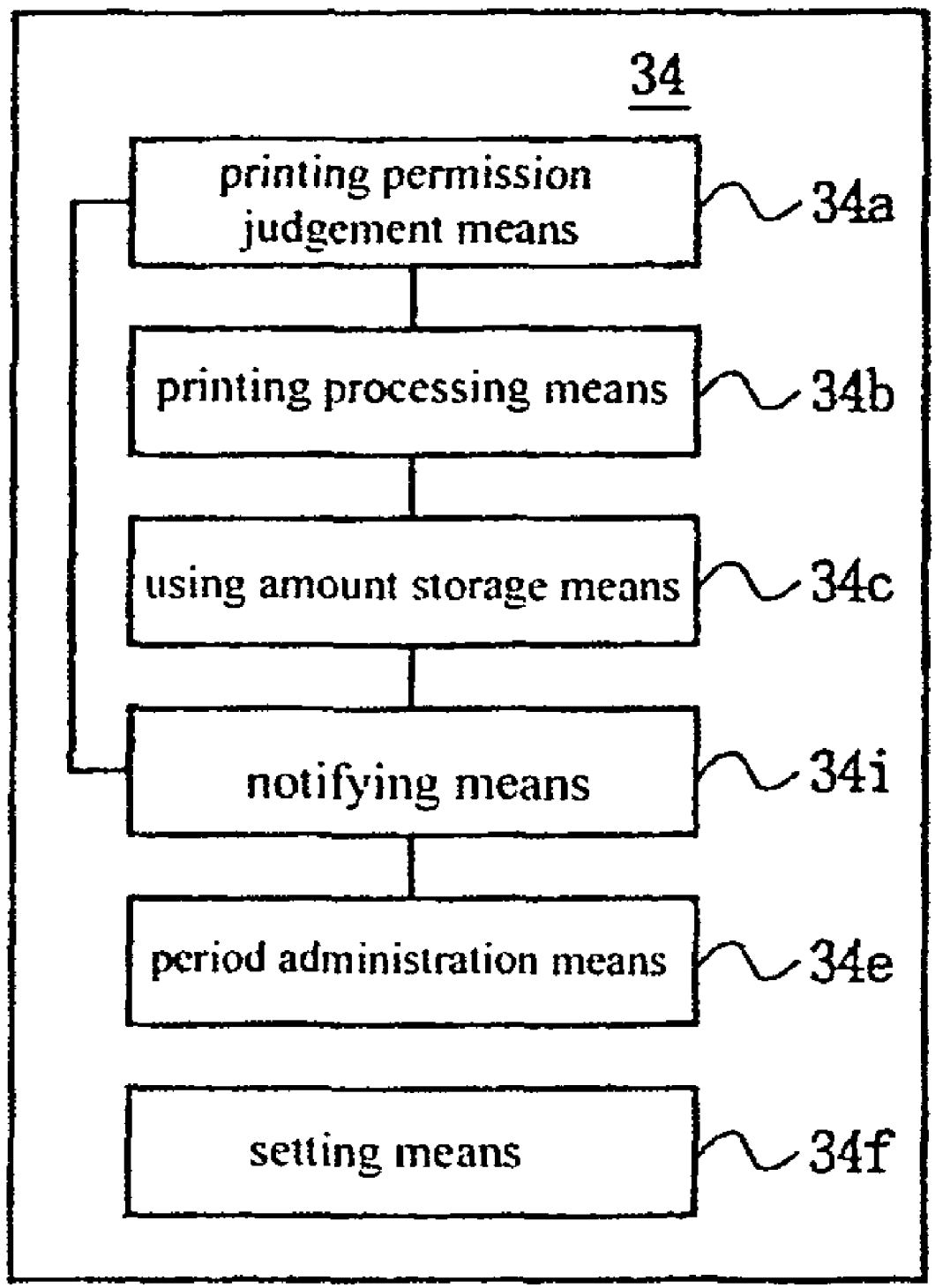
FIG. 25 is a block diagram showing a structure of a control section for the printer apparatus according to the fourth embodiment of this invention.

FIG. 25 is a block diagram showing the structure of the control section for the printer apparatus according to the fourth embodiment of this invention.

As shown in FIG. 25, from the viewpoint to the function, the control section 34 has the printing permission judgment means 34*a*, the printing processing means 34*b*, the using amount storage means 34*c*, a notifying means, or notifier, 34*i* for informing the computer 20 though the input/output interface 31, the period administration means 34*e*, and the setting means 34*f*, thereby controlling the printing operation on the recording sheet. The period administration means 34*e* detects the state where the next month begins to inform the state to the notifying means 34*i*. The setting means 34*f* displays on the touch panel 32 the setting screen 90 for setting the printable sheet number and the remaining notice sheet number, thereby storing in the memory section 35 the IP address, the printable sheet number, and the remaining notice sheet number set on the setting screen 90. It is to be noted that the remaining notice sheet number as the usable remaining amount is a value informing when the value of the total printing sheet umber subtracted from the printable sheet number is less than the remaining notice sheet number.

The printer apparatus 30 structured like the above will be next explained. Operation for setting the printable sheet number and the remaining notice sheet number for each IP address, will be first explained.

Figure 26:
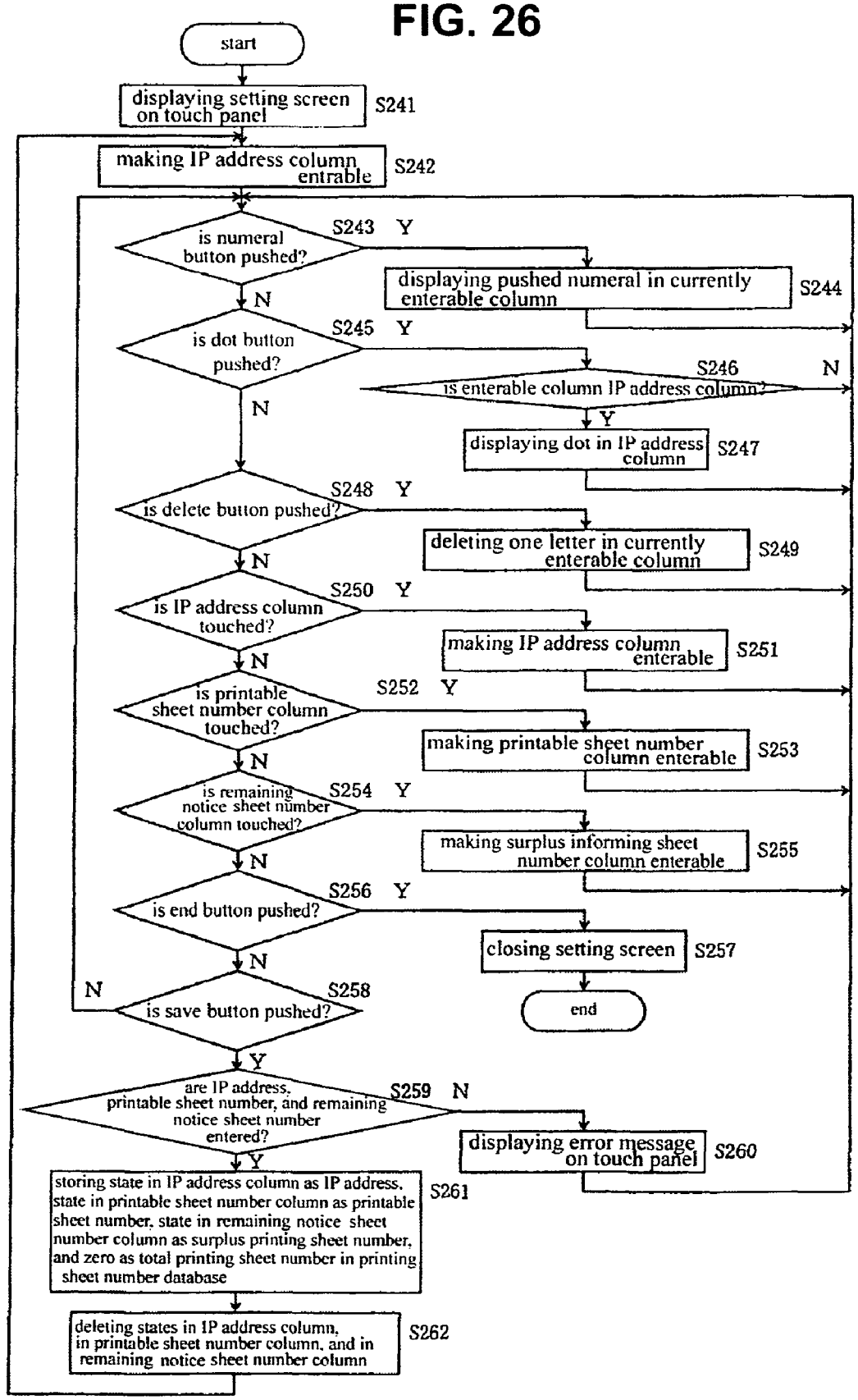
FIG. 26 is a flow chart showing operation of setting processes for a printable sheet number and a remaining notice sheet number according to the fourth embodiment of this invention.

FIG. 26 is a flow chart showing operation of setting processes for the printable sheet number and the remaining notice sheet number according to the fourth embodiment of this invention.

Where the administrator selects a function for setting the printable sheet number and the remaining notice sheet number, the printer apparatus 30 displays the setting screen 90 on the touch panel 32 to make the IP address column 50*a* enterable. Where the numeral button 40*d* is pushed, the printer apparatus 30 displays the pushed numeral in the currently enterable column. Where the dot button 50*b* is pushed, the printer apparatus 30 makes a judgment as to whether the currently enterable column is the IP address 50*a*. Where the currently enterable column is the IP address 50*a*, the printer apparatus 30 displays the dot. Where the delete button 40*e* is pushed, the printer apparatus 30 deletes one letter in the currently enterable column while where the IP address column 50*a* is touched, the printer apparatus 30 makes the IP address column 50*a* enterable. Furthermore, where the printable sheet number column 40*a* is touched, the printer apparatus 30 makes the printable sheet number column 40*a* enterable while where the remaining notice sheet number column 90*a* is touched, the printer apparatus 30 makes the remaining notice sheet number column 90*a* enterable. Where the end button 40*c* is pushed, the printer apparatus 30 closes the setting screen 90.

Where the save button 40*b* is pushed, the judgment is made as to whether any of the IP address column 50*a*, the printable sheet number column 40*a*, or the remaining notice sheet number column 90*a* is entered. Where none of the IP address column 50*a*, the printable sheet number column 40*a*, and the remaining notice sheet number column 90*a* is entered, the printer apparatus 30 displays the error message on the touch panel 32. Where all of the IP address column 50*a*, the printable sheet number column 40*a*, and the remaining notice sheet number column 90*a* are entered, the printer apparatus 30 stores in the printing sheet number database 35*a* the state in the IP address column 50*a* as the IP address, the state in the printable sheet number 40*a* as the printable sheet number and the standard printable sheet number, the state in the remaining notice sheet number 90*a* as the remaining notice sheet number, and zero as the total printing sheet number, thereby deleting the states in the IP address column 50*a*, the printable sheet number column 40*a*, and the remaining notice sheet number 90*a*.

A flow chart is hereinafter explained. The printer apparatus 30 displays the setting screen on the touch panel 32 at the step S241. The printer apparatus 30 makes the IP address column 50*a* enterable at the step S242. The judgment is made at the step S243 as to whether the numeral button 40*d* is pushed. Where the numeral button 40*d* is pushed, the operation goes to the step S244 while where none of the numeral buttons is not pushed, the operation goes to the step S245. The printer apparatus 30 displays the pushed numeral in the currently enterable column at the step S244. The judgment is made at the step S245 as to whether the dot button 50 is pushed. Where the dot button 50 is pushed, the operation goes to the step S246 while where the dot button 50*b* is not pushed, the operation goes to the step S248. The judgment is made at the step S246 as to whether the enterable column is the IP address column 50*a*. Where the enterable column is the IP address column 50*a*, the operation goes to the step S247 while where the enterable column is not the IP address column 50*a*, the operation goes to the step S243. The printer apparatus 30 displays the dot in the IP address column 50*a* at the step S247. The judgment is made at the step S248 as to whether the delete button 40*e* is pushed. Where the delete button 40*e* is pushed, the operation goes to the step S249 while where the delete button 40*e* is not pushed, the operation goes to the step S250. The printer apparatus 30 deletes one letter in the currently enterable column at the step S249. The judgment is made at the step S250 as to whether the IP address column 50*a* is touched. Where the IP address column 50*a* is touched, the operation goes to the step S251 while where the IP address column 50*a* is not touched, the operation goes to the step S252. The printer apparatus 30 make the IP address column 50*a* enterable at the step S251. The judgment is made at the step S252 as to whether the printable sheet number column 40*a* is touched. Where the printable sheet number column 40*a* is touched, the operation goes to the step S253 while where the printable sheet number column 40*a* is not touched, the operation goes to the step S254. The printer apparatus 30 makes the printable sheet number column 40*a* enterable at the step S253. The judgment is made at the step S254 as to whether the remaining notice sheet number column 90*a* is touched. Where the remaining notice sheet number column 90*a* is touched, the operation goes to the step S255 while where the remaining notice sheet number column 90*a* is not touched, the operation goes to the step S256. The printer apparatus 30 makes the remaining notice sheet number column 90*a* enterable at the step S255. The judgment is made at the step S256 as to whether the end button 40*c* is pushed. Where the end button 40*c* is pushed, the operation goes to the step S257 while where the end button 40*c* is not pushed, the operation goes to the step S258. The printer apparatus 30 closes the stetting screen 90 and makes this processing over at the step S257. The judgment is made at the step S258 as to whether the save button 40*b* is pushed. Where the save button 40*b* is pushed, the operation goes to the step S259 while where the save button 40*b* is not pushed, the operation returns to the step S243. The judgment is made at the step S259 as to whether any of the IP address, the printable sheet number, or the remaining notice sheet number is entered. Where any of the IP address, the printable sheet number, or the remaining notice sheet number is entered, the operation goes to the step S261 while none of the IP address, the printable sheet number, and the remaining notice sheet number is entered, the operation goes to the step S260. The printer apparatus 30 displays the error message on the touch panel 32 at the step S260. At the step S261, the printer apparatus 30 stores in the printing sheet number database 35*a* the state in the IP address column 50*a* as the IP address, the state in the printable sheet number column 40*a* as the printable sheet number, the state in the remaining notice sheet number 90*a* as the remaining notice sheet number, and zero as the total printing sheet number. The printer apparatus 30 deletes the states in the IP address column 50*a*, the printable sheet number 40*a*, and the remaining notice sheet number column 90*a* at the step S262.

Operation in a case where the computer 20 transmits the IP address and the printing job through the network 10 to the printer apparatus 30, will be next explained.

Figure 27:
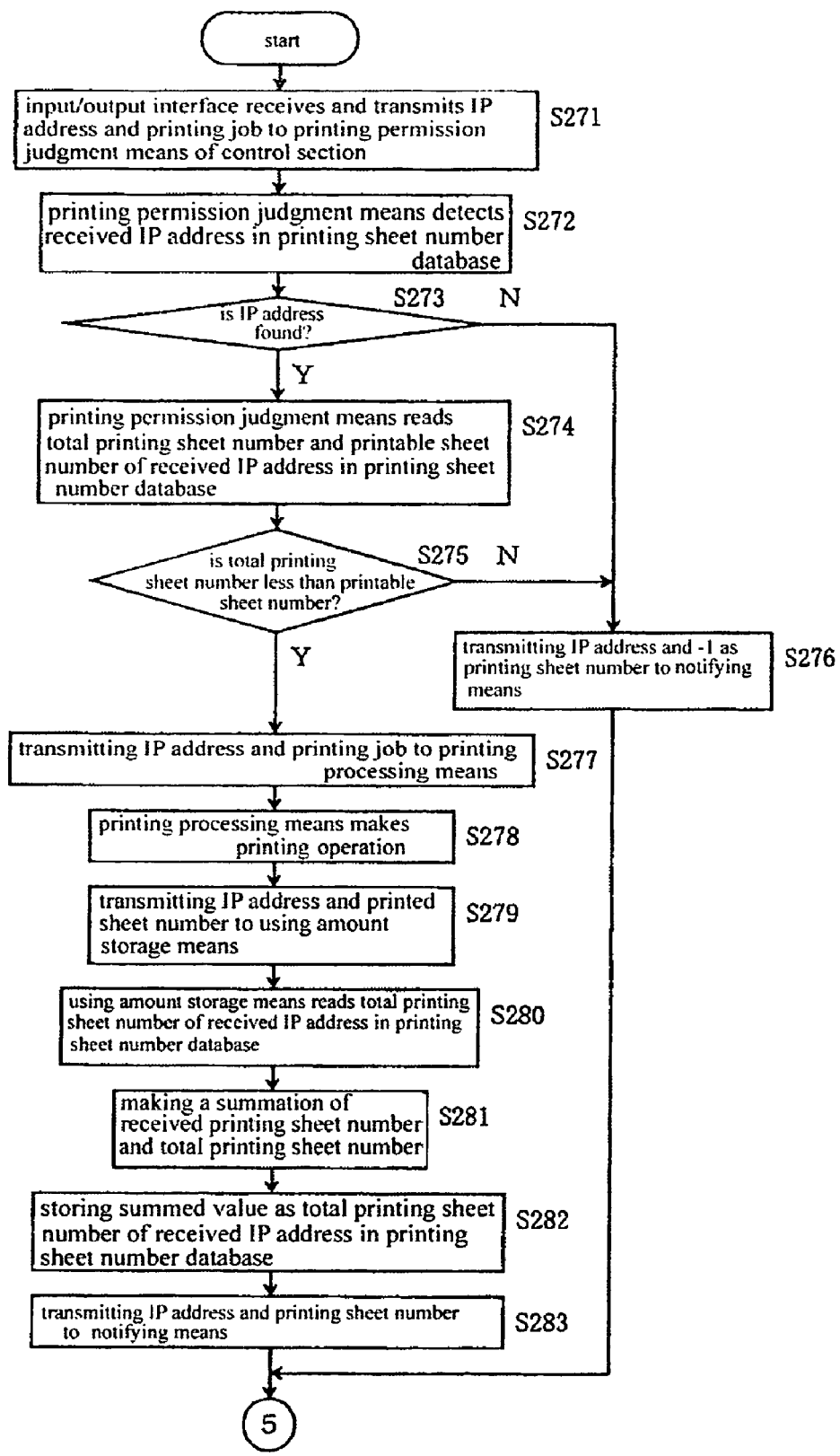
FIG. 27 is a first flow chart showing operation in a case of receipt of a printing job according to the fourth embodiment of this invention.
Figure 28:
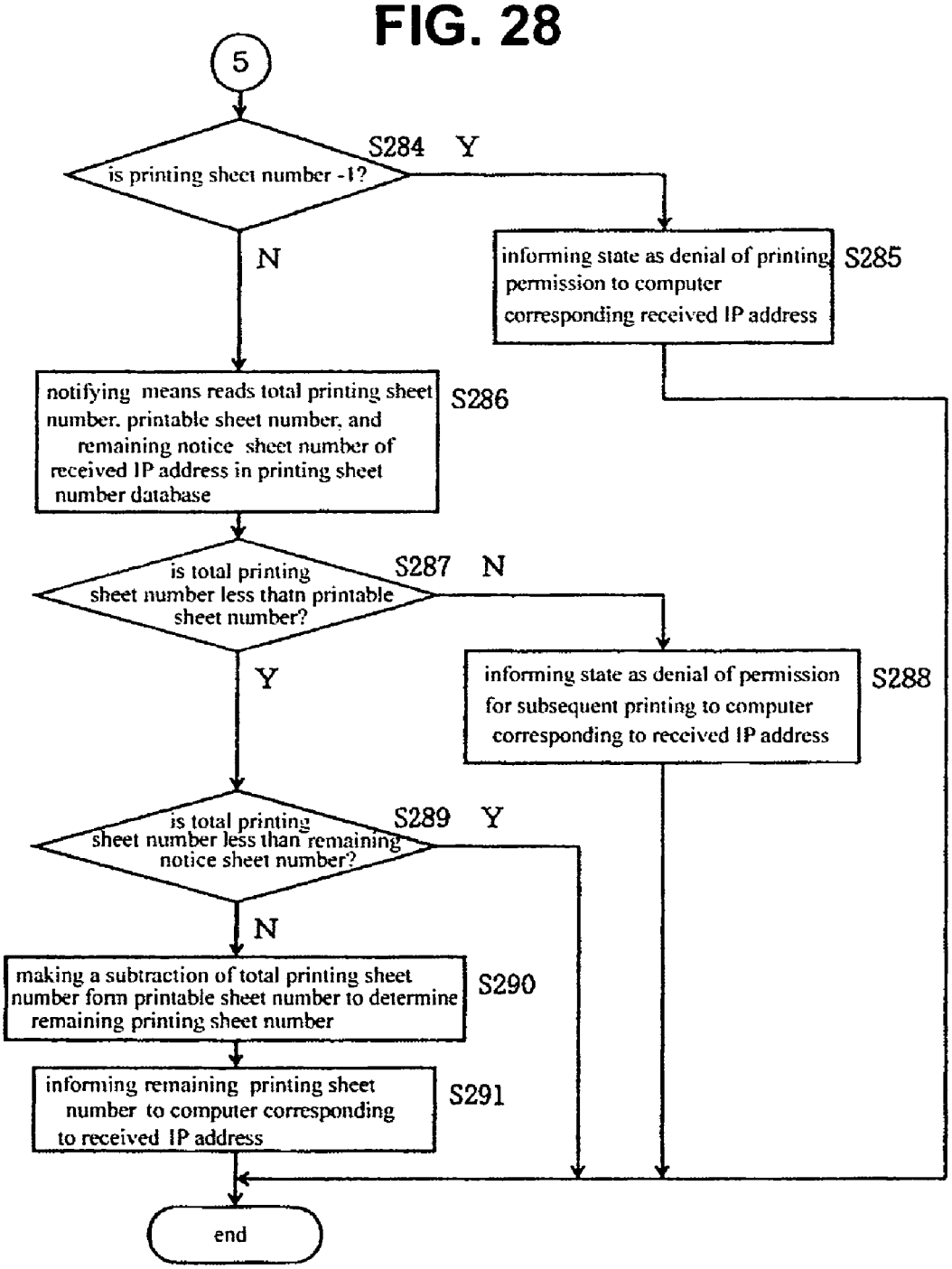
FIG. 28 is a second flow chart showing operation in a case of receipt of a printing job according to the fourth embodiment of this invention.

FIG. 27 is a first flow chart showing the operation in a case of receipt of the printing job according to the fourth embodiment of this invention. FIG. 28 is a second flow chart showing operation in the case of receipt of the printing job according to the fourth embodiment of this invention.

The input/output interface 31 receives and transmits the IP address and the printing job to the printing permission judgment means 34*a* of the control section 34. The printing permission judgment means 34*a* receives and detects the IP address in the printing sheet number database 35*a*, thereby making a judgment as to whether the IP address is found. Where the IP address is not found, the printing permission judgment means 34*a* transmits the IP address and −1 as the printing sheet number, indicating a denial of the printing permission to the notifying means 34*i*. Where the IP address is found, the printing permission judgment means 34*a* reads in the printing sheet number database 35*a* the total printing sheet number and the printable sheet number of the IP address, thereby comparing the total printing sheet number with the printable sheet number to make a judgment as to whether the total printing sheet number is less than the printable sheet number. In a case where the total printing sheet number equals the printable sheet number, or where the total printing sheet number is more than the printable sheet number, the printing permission judgment means 34*a* transmits the IP address and −1 as the printing sheet number, indicating the denial of the printing permission to the notifying means 34*i*. Where the total printing sheet number is less than the printable sheet number, the printing permission judgment means 34*a* transmits the received IP address and the printing job to the printing processing means 34*b*. The printing processing means 34*b* then makes the printing operation of the received printing job and, thereby transmitting the printed sheet number and the received IP address to the using amount storage means 34*c*.

The using amount storage means 34*c* reads the total printing sheet number of the received IP address in the printing sheet number database 35*a*, thereby making a summation of the received printing sheet number and the total printing sheet number, thereby storing the summed value as the total printing sheet number of the received IP address in the printing sheet number database 35*a* to transmit the IP address and the printing sheet number to the notifying means 34*i*.

Subsequently, in case of receiving −1 as the printing sheet number, indicating the denial of the printing permission, the notifying means 34*i* subsequently informs the computer 20 corresponding to the received IP address the state where the printing is not permitted. In case of receiving other than −1 as the printing sheet number, indicating the denial of the printing permission, the notifying means 34*i* reads in the printing sheet number database 35*a* the total printing sheet number, the printable sheet number, and the remaining notice sheet number of the received IP address. The notifying means 34*i* subsequently compares the total printing sheet number with the printable sheet number to make a judgment as to whether the total printing sheet number is less than printable sheet number. In a case where the total sheet number equals the printable sheet number or where the total printing sheet number is more than the printable sheet number, the notifying means 34*i* informs the state where a subsequent printing is not permitted to the computer 20 corresponding to the received IP address. Where the total sheet number is less than the remaining notice sheet number, the notifying means 34*i* compares the total printing sheet number with the remaining notice sheet number. In a case where the total printing sheet number equals the remaining notice sheet number, or where the total printing sheet number is more than the remaining notice sheet number, the notifying means 34*i* makes a subtraction of the total printing sheet number from the printable sheet number to determine the remaining sheet number, informing the remaining sheet number to the computer 20 corresponding to the received IP address.

A flow chart is hereinafter explained. The input/output interface 31 receives and transmits the IP address and the printing job to the printing permission judgment means 34*a* of the control section 34 at the step S271. The printing permission judgment means 34*a* detects the received IP address in the printing sheet number database 35*a* at the step S272. The judgment is made at the step S273 as to whether the IP address is found. Where the IP address is found, the operation goes to the step S274 while where the IP address is not found, the operation goes to the step S276. The printing permission judgment means 34*a* reads the total sheet number and the printable sheet number of the received IP address in the printing sheet number database 35*a* at the step S274. The judgment is made at the step S275 as to whether the total printing sheet number is less than the printable sheet number. Where the total printing sheet number is less than the printable sheet number, the operation goes to the step S277 while where the total printing sheet number is more than the printable sheet number, the operation goes to the step S276. The printing permission judgment means 34*a* transmits −1 as the IP address and the printing sheet number to the notifying means 34*i* at the step S276. The printing permission judgment means 34*a* transmits the IP address and the printing job to the printing processing means 34b at the step S277. The printing processing means 34b makes the printing operation at the step S278. The printing permission judgment means 34a transmits the IP address and the printed sheet number to the using amount storage means 34c at the step S279. The using amount storage means 34c reads the total printing sheet number of the IP address in the printing sheet number database 35a at the step S280. The using amount storage means 34c makes a summation of the received printing sheet number and the total printing sheet number at the step S281. The using amount storage means 34c stores in the printing sheet number database 35a the summed value as the total printing sheet number of the received IP address at the step S282. The using amount storage means 34c transmits the IP address and the printing sheet number to the notifying means 34i at the step S283. The judgment is made at the step S284 as to whether the printing sheet number is −1. Where the printing sheet number is −1, the operation goes to the step S285 while where the printing sheet number is not −1, the operation goes to the step S286. The using amount storage means 34c informs at the step S285 the state where the printing is not permitted the computer corresponding to the received IP address. At the step S286, the notifying means 34i reads in the printing sheet number database 35a the total printing sheet number, the printable sheet number, and the remaining notice sheet number of the received IP address. The judgment is made at the step S287 as to whether the total printing sheet number is less than the printable sheet number. Where the total printing sheet number is less than the printable sheet number, the operation goes to the step S289 while where the total printing sheet number is more than the printable sheet number, the operation goes to the step S288. The notifying means 34i informs at the step S288 the state where the subsequent printing is not permitted to the computer 20 corresponding to the received IP address. The judgment is made at the step S289 as to whether the total printing sheet number is less than the remaining notice sheet number. Where the total printing sheet number is less than the remaining notice sheet number, this processing ends while where the total printing sheet number is more than the remaining notice sheet number, the operation goes to the step S290. The notifying means 34i makes a subtraction of the total printing sheet number form the printable sheet number to determine the remaining printing sheet number at the step S290. The notifying means 34i informs at the step S291 the remaining printing sheet number to the computer corresponding to the received IP address.

Operation when the predetermined period (set to one month in this embodiment) past, will be next explained.

Figure 29:
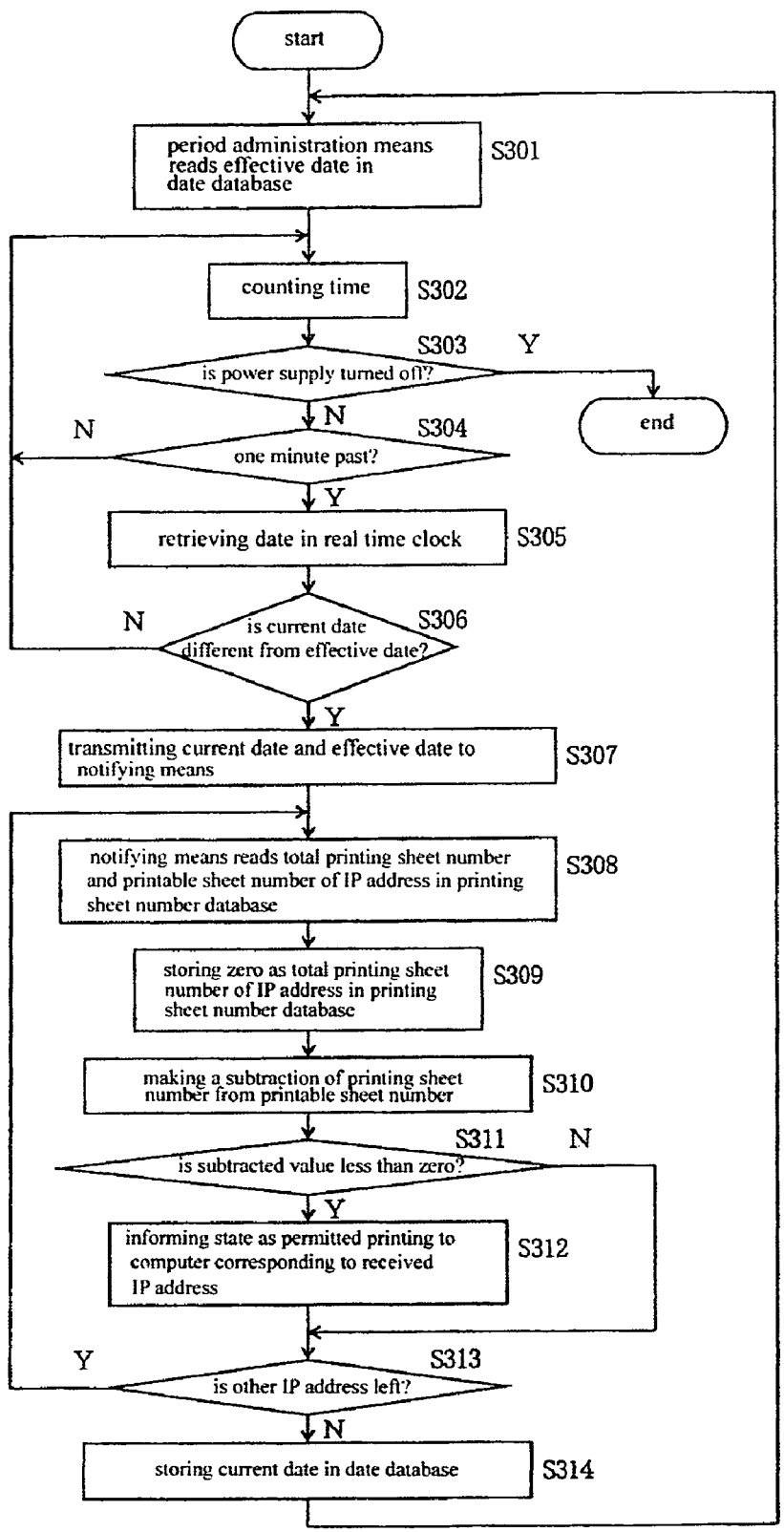
FIG. 29 is a flow chart showing operation in a case where a predetermined period past according to the fourth embodiment of this invention.

FIG. 29 is a flow chart showing the operation in a case where the predetermined period past according to the fourth embodiment of this invention.

When the power supply of the printer apparatus 30 is turned on, the period administration means 34e reads the effective date in the date database 35b, thereby counting time, thereby confirming that the power supply is not turned off, and then inquires the real time clock 33 for the date in a case where one minute past. Where the current date is different from the effective date, the period administration means 34e transmits the current date and the effective date to the notifying means 34i.

The notifying means 34i subsequently reads the total printing sheet number and the printable sheet number of the IP address in the printing sheet number database 35a, thereby storing zero as the total printing sheet number, thereby making a subtraction of the total printing sheet number from the printable sheet number. Where the subtracted value is less than zero, the notifying means 34i informs the computer 20 corresponding to the current IP address the state where the printing is permitted. Where no more IP address exists, the notifying means 34i stores the current date in the date database 35b.

A flow chart is hereinafter explained. The period administration means 34e reads the effective date in the date database at the step S301. The period administration means 34e counts time at the step S302. The judgment is made at the step S303 as to whether the power supply is turned off. Where the power supply is turned off, this processing ends while where the power supply is not turned off, the operation goes to the step S304. The judgment is made at the step S304 as to whether one minute past. Where one minute past, the operation goes to the step S305 while where one minute does not pass yet, the operation returns to the step S302. The period administration means 34e retrieves the date from the real time clock 33 at the step S305. The judgment is made at the step S306 as to whether the current date is different from the effective time. Where the current date is different from the effective time, the operation goes to the step S307 while where the current date is not different from the effective time, the operation returns to the step S302. The period administration means 34e transmits the current date and the effective time to the notifying means 34i at the step S307. The notifying means 34i reads at the step S308 the total printing sheet number and the printable sheet number of the IP address in the printing sheet number database 35a. At the step S309, the notifying means 34i stores zero as the total printing sheet number of the IP address in the printing sheet number database 35a. The notifying means 34i makes a subtraction of the printing sheet number from the printable sheet number at the step S310. The judgment is made at the step S311 as to whether the subtracted value is less than zero. Where the subtracted value is less than zero, the operation goes to the step S312 while where the subtracted value is more than zero, the operation goes to the step S313. At the step S312, the notifying means 34i informs the state where the printing is permitted to the computer corresponding to the received IP address. The judgment is made at the step S313 as to whether any other IP address is left. Where other IP address is left, the operation returns to the step S308 while where no more IP address is left, the operation goes to the step S314. At the step S314, the notifying means 34i stores the current date in the date database 35b.

According to this embodiment, like the above, the remaining printing sheet number is informed to the computer 20 at the time the printable sheet number draws to an end, so it is able to grasp in advance feasibility of the printing operation.

In the aforementioned first to fourth embodiments, a case of the printer apparatus as the image forming apparatus is explained, but the image forming apparatus may be a copy machine or MFP (Multi Function Printer).

In the aforementioned first to fourth embodiments, a case of a medium, i.e., the recording sheet, as the consumption used for the image formation while the printing sheet number as the using amount, is explained, but the consumption may be a toner, a drum, or the like while the using amount may be the amount of the consumed toner, the period of use of the drum, or the like.

In the aforementioned first to fourth embodiments, a case of the IP address as the user identification information while a network as a connection condition is explained, but the user identification information may be a computer name or a login name while the connection condition may be parallel or USB (Universal Serial Bus). Furthermore, a case where the image forming data is entered according to the printing job from the computer, but this invention is applicable to a case where under condition of the single copy machine as the image forming apparatus, the image forming data is entered through a scanner portion while the user identification information is a copy card.

In the aforementioned first to fifth embodiments, the memory section may be a hard disk or a flesh memory.

The fourth embodiment is applicable to the structures in the aforementioned first embodiment to third embodiment. Furthermore, in the fourth embodiment, displaying on the display of the computer is explained as an example of the notifying means, but it is also possible to inform with the electronic mail.

This invention is not limited to the aforementioned embodiments but is able to be deformed variously corresponding to a purpose of this invention, and these deformations are not eliminated from the range of this invention.

The foregoing description of a preferred embodiment of the invention has been presented for purposes of illustration and description, and is not intended to be exhaustive or to limit the invention to the precise form disclosed. The description was selected to best explain the principles of the invention and practical application of these principals to enable others skilled in the art to best utilize the invention in various embodiments and various modifications as are suited to the particular use contemplated. It is intended that the scope of the invention should not be limited by the specification, but be defined by the claims set forth below.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An image forming apparatus comprising:
an entry section for entering image forming data and receiving a print job;
a using amount storage for storing a used amount of a consumption used during each of a plurality of predetermined periods for image formation;
a setting unit for setting a usable consumption amount during each predetermined period;
a usable amount determiner for determining the usable consumption amount of each predetermined period,
wherein the usable amount determiner determines, after a predetermined period, the usable consumption amount during a subsequent period according to the used amount stored in the using amount storage,
wherein the usable amount determiner subtracts the used amount stored in the using amount storage from the usable amount set by the setting unit for the predetermined period to get a carry over amount, and adds the carry over amount to a usable consumption amount for the subsequent period,
wherein the useable amount determiner prevents the carry over amount to be carried over to a period subsequent to the subsequent period, and
wherein the usable amount determiner determines whether a power supply of the image forming device remains turned off for a second predetermined period, and sets the usable consumption amount to an initial value in response to determining that the power supply of the image forming device remains turned off for the second predetermined period, wherein the second predetermined period is at least the available time remaining from the predetermined period of the usable amount determiner, and a comparison unit which compares the used amount with the usable consumption amount at the time the print job is received, wherein if the used amount is less that the usable consumption amount, compares the used amount with the notification amount and informs a user identified corresponding to the user identification information a remaining usable consumption amount if the used amount is less than the usable consumption amount and greater than the notification amount, and if the used amount is not less than the useable consumption amount, the notifier informs that a subsequent print job directed to the image forming device is not permitted.

2. An image forming apparatus comprising:
an entry section for entering user identification information, image forming data and receiving a print job;
a using amount storage for storing, corresponding to each user identification information, a using amount of a consumption used during a predetermined period for image formation;
a setting unit for setting a usable consumption amount during the predetermined period corresponding to each user identification information; and
a usable amount determiner for determining the usable consumption amount of each determined period,
wherein the usable amount determiner determines, after the predetermined period, the usable consumption amount during the subsequent period according to the used amount stored in the using amount storage of each user identification information, and
wherein the usable amount determiner subtracts the used amount stored in the using amount storage from the usable amount set by the setting unit to get a carry over amount, and adds the carry over amount to a usable consumption amount for a subsequent period, and
wherein the useable amount determiner prevents the carry over amount to be carried over to a period subsequent to the subsequent period, and
wherein the usable amount determiner determines whether a power supply of the image forming device remains turned off for a second predetermined period, and sets the usable consumption amount to an initial value in response to determining that the power supply of the image forming device remains turned off for the second predetermined period, wherein the second predetermined period is at least the available time remaining from the predetermined period of the usable amount determiner, and
a comparison unit which compares the used amount with the usable consumption amount at the time the print job is received, wherein if the used amount is less that the usable consumption amount, compares the used amount with the notification amount and informs a user identified corresponding to the user identification information a remaining usable consumption amount if the used amount is less than the usable consumption amount and greater than the notification amount, and if the used amount is not less than the useable consumption amount, the notifier informs that a subsequent print job directed to the image forming device is not permitted.

3. The image forming apparatus according to claim 1, wherein the usable amount determiner makes a sum of subtracted amounts of the usable amounts set with the setting unit respectively minus the used amounts stored with the using amount storage, to determine the usable consumption amount during the subsequent predetermined period.

4. An image forming system comprising:
an image forming apparatus for forming an image according to entered image forming data; and
an administration server for counting a used amount of a consumption used with the image forming apparatus,
wherein the image forming apparatus includes an entry section for entering at least one user identification information, the image forming data and receiving a print job; and a using amount storage for storing a used amount of a consumption used during a predetermined period for image formation corresponding to each user identification information,
wherein the administration server has a using amount retriever for retrieving the used amount in the image forming apparatus; a setting unit for setting a usable consumption amount during the predetermined period corresponding to each user identification information; a comparison unit which compares the used amount with the usable consumption amount at the time the print job is received by the image forming device, and a usable amount determiner for determining the usable consumption amount of each determined period,
wherein the usable amount determiner determines after the predetermined period the usable consumption amount during a subsequent period corresponding to the used amount of each user identification information,
wherein the usable amount determiner subtracts the used amount stored in the using amount storage from the usable amount set by the setting unit to get a carry over amount, and adds the carry over amount to a usable consumption amount for a subsequent period,
wherein the useable amount determiner prevents the carry over amount to be carried over to a period subsequent to the subsequent period,
wherein the usable amount determiner determines whether a power supply of the image forming device remains turned off for a second predetermined period, and sets the usable consumption amount to an initial value in response to determining that the power supply of the image forming device remains turned off for the second predetermined period, wherein the second predetermined period is at least the available time remaining from the predetermined period of the using amount storage, and
wherein if the comparator determines that the used amount is less that the usable consumption amount, compares the used amount with the notification amount and informs a user identified corresponding to the user identification information a remaining usable consumption amount if the used amount is less than the usable consumption amount and greater than the notification amount, and if the used amount is not less than the useable consumption amount, the notifier informs that a subsequent print job directed to the image forming device is not permitted.

5. The image forming system according to claim 4, wherein the usable amount determiner makes a sum of subtracted amounts of the usable amounts set with the setting unit respectively minus the used amounts stored with the using amount storage, to determine the usable consumption amount during the subsequent predetermined period.

6. An image forming apparatus comprising:
an entry section for entering image forming data and receiving a print job;
a using amount storage for storing a used amount of a consumption used during a predetermined period for image formation;
a setting unit for setting a usable consumption amount for consumption during the predetermined period and a notification amount for the predetermined period, the notification amount being a smaller amount than the usable consumption amount; and
a notifier which compares the used amount with the usable consumption amount at the time the print job is received, wherein
if the used amount is less than the usable consumption amount, the notifier compares the used amount with the notification amount and informs a remaining usable consumption amount if the used amount is less than the usable consumption amount and greater than the notification amount,
if the used amount is not less than the useable consumption amount, the notifier informs that a subsequent print job directed to the image forming device is not permitted, and
if the notifier determines that a power supply of the image forming device remains turned off for a second predetermined period, the notifier sets the usable consumption amount to an initial value, wherein the second predetermined period is at least the available time remaining from the predetermined period of the using amount storage.

7. An image forming apparatus comprising:
an entry section for entering user identification information, image forming data and receiving a print job;
a using amount storage for storing corresponding to each user identification information a used amount of a consumption used during a predetermined period for image formation;
a setting unit for setting a usable consumption amount for consumption during the predetermined period corresponding to each user identification information and a notification amount for the predetermined period, the notification amount being a smaller amount than the usable consumption amount; and
a notifier which compares the used amount with the usable consumption amount at the time the print job is received, wherein
if the used amount is less that the usable consumption amount, then compares the used amount with the notification amount and informs a user identified corresponding to the user identification information a remaining usable consumption amount if the used amount is less than the usable consumption amount and greater than the notification amount,
if the used amount is not less than the useable consumption amount, the notifier informs that a subsequent print job directed to the image forming device is not permitted, and
if the notifier determines that a power supply of the image forming device remains turned off for a second predetermined period, the notifier sets the usable consumption amount to an initial value, wherein the second predetermined period is at least the available time remaining from the predetermined period of the using amount storage.

8. An image forming system comprising:
an image forming apparatus for forming an image according to entered image forming data; and
an administration server for a used amount of a consumption used by the image forming apparatus during a predetermined period,
wherein the image forming apparatus has an entry section for receiving user identification information, the image forming data and a print job, and a using amount storage for storing the identification information corresponding to the user identification information and a the used amount of a consumption used during the predetermined period, wherein the administration server has a used amount retriever for retrieving the used amount during the predetermined period in the image forming apparatus and a notifier for informing the remaining usable amount during the predetermined period to a user identified corresponding to the user identification information, and wherein at the time the print job is received, the notifier compares the used amount during the predetermined period corresponding to the user with a usable consumption amount during the predetermined period, wherein if the used amount is less than the usable consumption amount, then compares the used amount with a notification amount for the predetermined period and informs the user corresponding to the user identification information a remaining usable consumption amount for the predetermined period if the used amount is less than the usable consumption amount and greater than the notification amount, if the used amount is not less than the useable consumption amount, the notifier informs that a subsequent print job directed to the image forming device is not permitted, and if the notifier determines that a power supply of the image forming device remains turned off for a second predetermined period, the notifier sets the usable consumption amount to an initial value, wherein the second predetermined period is at least the available time remaining from the predetermined period of the administration server.

9. The image forming apparatus according to claim 2, wherein the usable amount determiner makes a sum of subtracted amounts of the usable amounts set with the setting unit respectively minus the used amounts stored with the using amount storage, to determine the usable consumption amount during the subsequent predetermined period.

\* \* \* \* \*